US010542198B2

(12) United States Patent
Shimura et al.

(10) Patent No.: US 10,542,198 B2
(45) Date of Patent: Jan. 21, 2020

(54) OPERATION SUPPORT SYSTEM, WEARABLE APPARATUS, IMAGE PICKUP APPARATUS, AND OPERATION SUPPORT METHOD

(71) Applicant: OLYMPUS CORPORATION, Hachioji-shi, Tokyo (JP)

(72) Inventors: Kazuhiko Shimura, Hachioji (JP); Kazuo Kanda, Higashiyamato (JP); Yoshiyuki Fukuya, Sagamihara (JP); Takashi Muroi, Higashiyamato (JP); Yuji Miyauchi, Machida (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/980,161

(22) Filed: May 15, 2018

(65) Prior Publication Data

US 2019/0058818 A1 Feb. 21, 2019

(30) Foreign Application Priority Data

Aug. 16, 2017 (JP) ................................ 2017-157042

(51) Int. Cl.
*H04N 5/225* (2006.01)
*G03B 17/56* (2006.01)
(Continued)

(52) U.S. Cl.
CPC ......... *H04N 5/2258* (2013.01); *G03B 17/561* (2013.01); *G06F 16/50* (2019.01);
(Continued)

(58) Field of Classification Search
CPC ....... G03B 17/561; G06F 16/50; G06F 3/011; G06Q 10/20; G09B 19/24; G09B 5/02; G09B 5/04; H04N 2005/4408; H04N 5/2258; H04N 5/23296; H04N 5/247; H04N 5/4403
See application file for complete search history.

(56) References Cited

U.S. PATENT DOCUMENTS 7,483,049 B2 * 1/2009 Aman ................ A63B 24/0021 348/162
9,699,410 B1 * 7/2017 Nagabushanam ..... H04N 7/147
(Continued)

FOREIGN PATENT DOCUMENTS

JP 2017-075001 A 4/2017

*Primary Examiner* — Amy R Hsu
(74) *Attorney, Agent, or Firm* — Volpe and Koenig, P.C.

(57) ABSTRACT

To provide an operation support system capable of performing evidence recording of each of performed operations, an operation support system includes a first image pickup apparatus configured to mainly acquire movie data, a second image pickup apparatus configured to mainly acquire still image data, a control apparatus configured to control the first image pickup apparatus and the second image pickup apparatus in cooperation with each other while acquiring operation information about a predetermined operation, and a database storing defined operation information about the predetermined operation in advance, in which the predetermined operation is supported based on image data acquired by causing the first image pickup apparatus and the second image pickup apparatus to cooperate with each other.

11 Claims, 15 Drawing Sheets

153a
20
153
100
154
153b
100L
150a
100R
150
151
200
30
300

(51) Int. Cl.
*H04N 5/44* (2011.01)
*H04N 5/232* (2006.01)
*G06F 16/50* (2019.01)

(52) U.S. Cl.
CPC ....... *H04N 5/23296* (2013.01); *H04N 5/4403* (2013.01); *H04N 2005/4408* (2013.01)

(56) References Cited

U.S. PATENT DOCUMENTS

| | | | | |
|---|---|---|---|---|
| 2010/0048273 | A1* | 2/2010 | Wallace | G09B 19/24 463/7 |
| 2011/0216208 | A1* | 9/2011 | Matsuzawa | H04N 5/23203 348/211.2 |
| 2012/0089949 | A1* | 4/2012 | Chen | G06F 3/005 715/848 |
| 2014/0184854 | A1* | 7/2014 | Musatenko | H04N 5/23296 348/240.2 |
| 2014/0267775 | A1* | 9/2014 | Lablans | H04N 5/247 348/169 |
| 2015/0271414 | A1* | 9/2015 | Sato | H04N 5/23293 348/239 |
| 2016/0132532 | A1* | 5/2016 | German | G06F 16/5854 382/103 |
| 2017/0178475 | A1* | 6/2017 | Renkis | H04W 4/70 |
| 2017/0323458 | A1* | 11/2017 | Lablans | G01S 19/48 |
| 2018/0063510 | A1* | 3/2018 | Wolke | H04N 5/23293 |

* cited by examiner

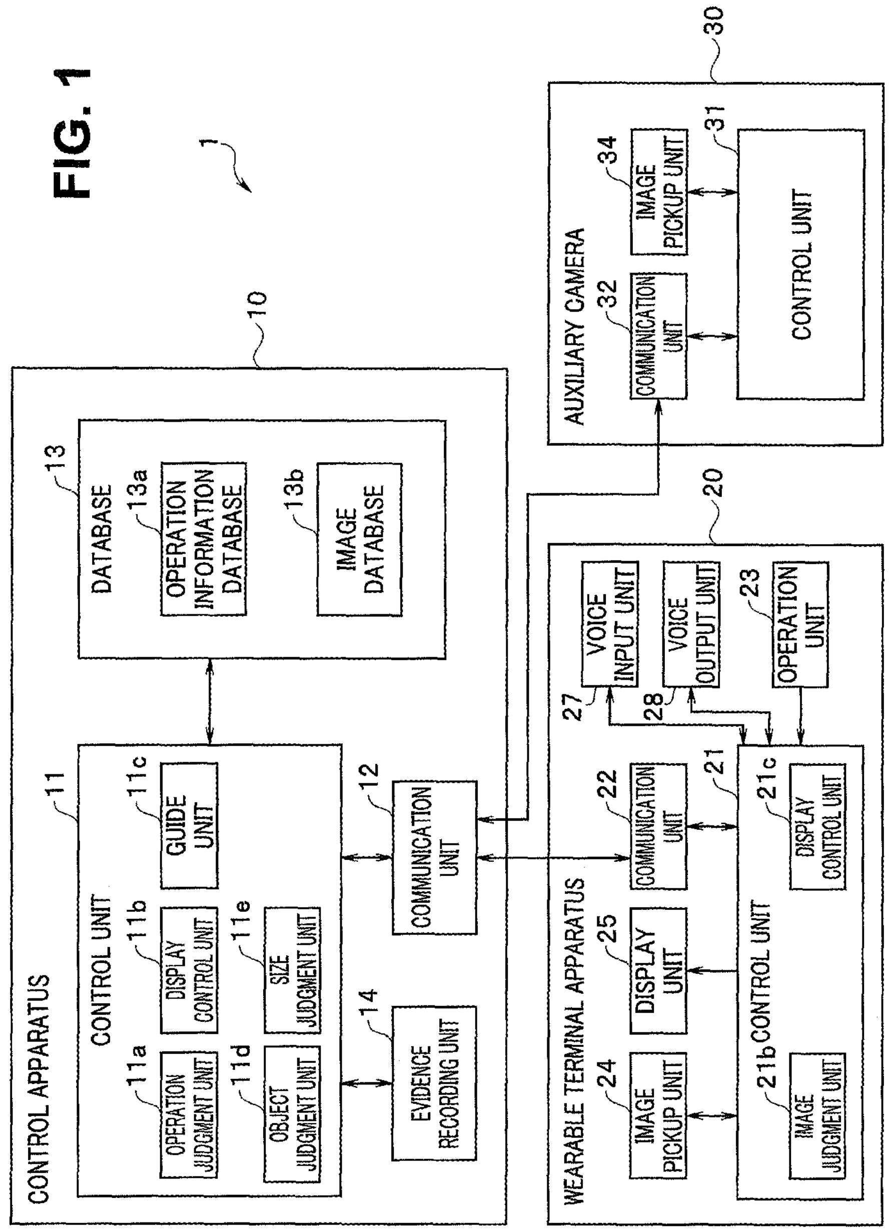
FIG. 1
1
10
CONTROL APPARATUS
11
CONTROL UNIT
11a
OPERATION JUDGMENT UNIT
11b
DISPLAY CONTROL UNIT
11c
GUIDE UNIT
11d
OBJECT JUDGMENT UNIT
11e
SIZE JUDGMENT UNIT
12
COMMUNICATION UNIT
13
DATABASE
13a
OPERATION INFORMATION DATABASE
13b
IMAGE DATABASE
14
EVIDENCE RECORDING UNIT
20
WEARABLE TERMINAL APPARATUS
21
CONTROL UNIT
21b
IMAGE JUDGMENT UNIT
21c
DISPLAY CONTROL UNIT
22
COMMUNICATION UNIT
23
OPERATION UNIT
24
IMAGE PICKUP UNIT
25
DISPLAY UNIT
27
VOICE INPUT UNIT
28
VOICE OUTPUT UNIT
30
AUXILIARY CAMERA
31
CONTROL UNIT
32
COMMUNICATION UNIT
34
IMAGE PICKUP UNIT

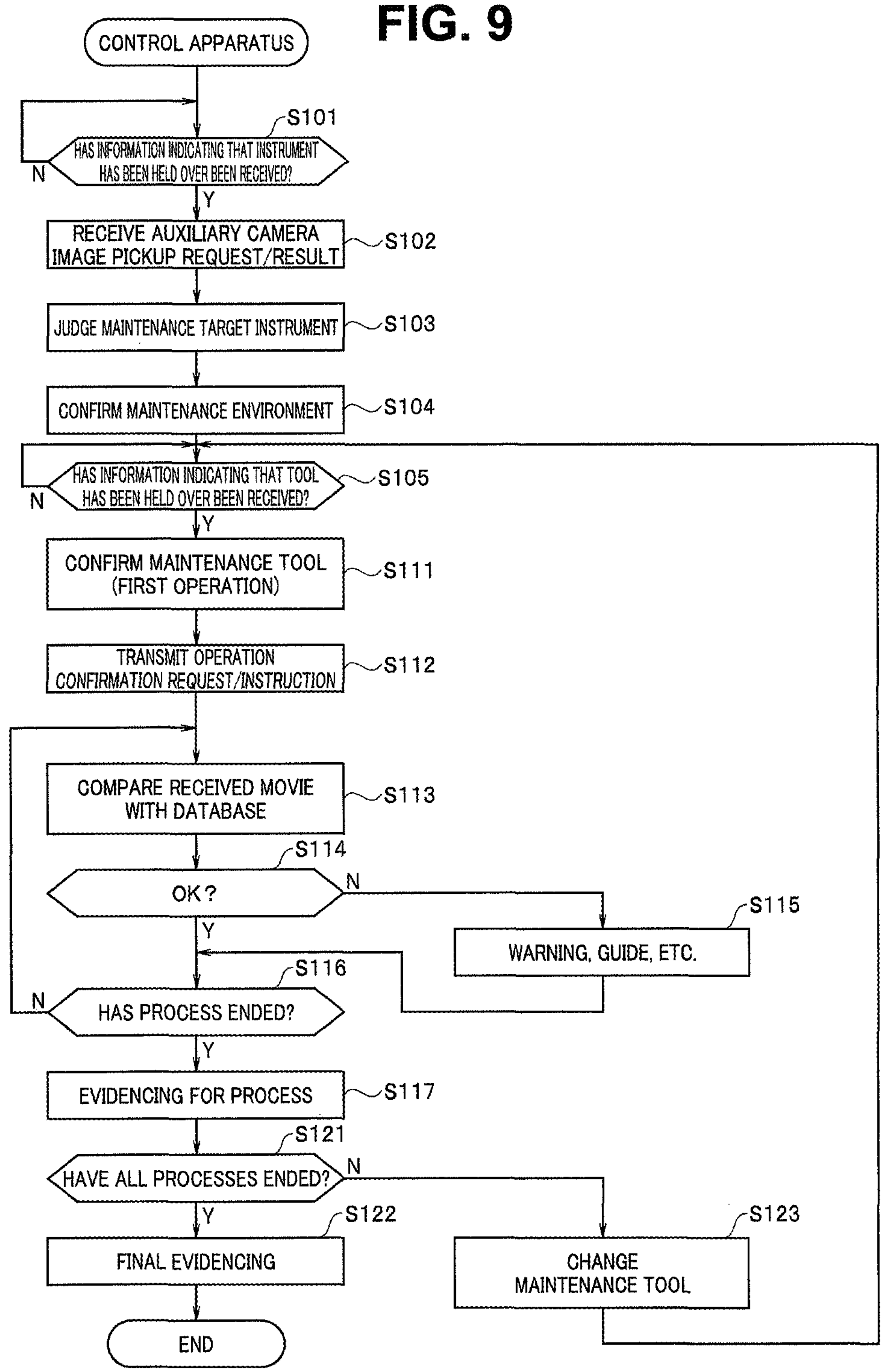
FIG. 9
CONTROL APPARATUS
S101
HAS INFORMATION INDICATING THAT INSTRUMENT HAS BEEN HELD OVER BEEN RECEIVED?
N
Y
RECEIVE AUXILIARY CAMERA IMAGE PICKUP REQUEST/RESULT
S102
JUDGE MAINTENANCE TARGET INSTRUMENT
S103
CONFIRM MAINTENANCE ENVIRONMENT
S104
HAS INFORMATION INDICATING THAT TOOL HAS BEEN HELD OVER BEEN RECEIVED?
S105
N
Y
CONFIRM MAINTENANCE TOOL (FIRST OPERATION)
S111
TRANSMIT OPERATION CONFIRMATION REQUEST/INSTRUCTION
S112
COMPARE RECEIVED MOVIE WITH DATABASE
S113
S114
OK?
N
Y
S115
WARNING, GUIDE, ETC.
S116
HAS PROCESS ENDED?
N
Y
EVIDENCING FOR PROCESS
S117
S121
HAVE ALL PROCESSES ENDED?
N
Y
S122
FINAL EVIDENCING
S123
CHANGE MAINTENANCE TOOL
END

FIG. 12

[OPERATION INFORMATION DATABASE]

| MAINTENANCE TARGET [A] | OPERATION PROCESS [B] | OPERATION CONTENT [C] | OPERATION INFORMATION [D] | |
|---|---|---|---|---|
| | | | WEARABLE TERMINAL APPARATUS (MOVIE) [D1] | AUXILIARY CAMERA (STILL IMAGE) [D2] |
| TARGET 1: SCISSORS | FIRST PROCESS: BRUSHING | FIRST OPERATION: TOOL CONFIRMATION | ACTION FOR HOLDING BRUSH OVER FRONT OF AUXILIARY CAMERA, ETC. | ENLARGED IMAGE, PERIPHERAL IMAGE OF BRUSH |
| | | SECOND OPERATION: FIRST SITE BRUSHING | OPERATION IMAGE (NUMBER OF TIMES, TIME) | IMAGE OF FIRST SITE (EXAMPLE; BLADE PORTION) |
| | | THIRD OPERATION: SECOND SITE BRUSHING | OPERATION IMAGE (NUMBER OF TIMES, TIME) | IMAGE OF SECOND SITE (EXAMPLE; JOINT PORTION) |
| | SECOND PROCESS: RUNNING WATER WASHING | FIRST OPERATION: TOOL, FLOW RATE CONFIRMATION | ACTION FOR OPENING FAUCET, ETC. | RUNNING WATER IMAGE OF FAUCET |
| | | SECOND OPERATION: FIRST SITE RUNNING WATER WASHING | OPERATION IMAGE (TIME) | IMAGE OF FIRST SITE (EXAMPLE; BLADE PORTION) |
| | | THIRD OPERATION: SECOND SITE RUNNING WATER WASHING | OPERATION IMAGE (TIME) | IMAGE OF SECOND SITE (EXAMPLE; JOINT PORTION) |
| | THIRD PROCESS: SCRAPING | FIRST OPERATION: TOOL CONFIRMATION | ACTION FOR HOLDING TOOL OVER FRONT OF AUXILIARY CAMERA, ETC. | ENLARGED IMAGE OF TOOL |
| | | SECOND OPERATION: FIRST SITE SCRAPING | OPERATION IMAGE (NUMBER OF TIMES, TIME) | IMAGE OF FIRST SITE (EXAMPLE; BLADE PORTION) |
| | | THIRD OPERATION: SECOND SITE SCRAPING | OPERATION IMAGE (NUMBER OF TIMES, TIME) | IMAGE OF SECOND SITE (EXAMPLE; JOINT PORTION) |
| | FOURTH PROCESS: AGENT STERILIZATION | FIRST OPERATION: TOOL CONFIRMATION | ACTION FOR HOLDING TOOL OVER FRONT OF AUXILIARY CAMERA, ETC. | ENLARGED IMAGE OF TOOL (AGENT BOTTLE) |
| | | SECOND OPERATION: FIRST SITE SPRAYING, DRYING | OPERATION IMAGE (NUMBER OF TIMES, TIME) | IMAGE OF FIRST SITE (EXAMPLE; BLADE PORTION) |
| | | THIRD OPERATION: SECOND SITE SPRAYING, DRYING | OPERATION IMAGE (NUMBER OF TIMES, TIME) | IMAGE OF SECOND SITE (EXAMPLE; JOINT PORTION) |
| TARGET 2: ○○○ | FIRST PROCESS: □□□ | FIRST OPERATION: TOOL CONFIRMATION | ACTION FOR HOLDING TOOL OVER FRONT OF AUXILIARY CAMERA, ETC. | ENLARGED IMAGE OF TOOL |
| | | SECOND OPERATION: FIRST SITE □○□ | OPERATION IMAGE | IMAGE OF FIRST SITE |
| | | THIRD OPERATION: SECOND SITE △○▽ | OPERATION IMAGE | IMAGE OF SECOND SITE |
| | SECOND PROCESS: △△△ | FIRST OPERATION: TOOL CONFIRMATION | ACTION FOR HOLDING TOOL OVER FRONT OF AUXILIARY CAMERA, ETC. | ENLARGED IMAGE OF TOOL |
| | | SECOND OPERATION: FIRST SITE △△△ | OPERATION IMAGE | IMAGE OF FIRST SITE |

OPERATION SUPPORT SYSTEM, WEARABLE APPARATUS, IMAGE PICKUP APPARATUS, AND OPERATION SUPPORT METHOD

CROSS REFERENCE TO RELATED APPLICATION

This application claims the benefit of Japanese Application No. 2017-157042 filed in Japan on Aug. 16, 2017, the contents of which are incorporated herein by this reference.

BACKGROUND OF THE INVENTION

1. Field of the Invention

The present invention relates to an operation support system for supporting a predetermined operation for which an operation procedure is defined, a wearable apparatus, an image pickup apparatus, and an operation support method.

2. Description of the Related Art

Conventionally, various types of industrial products have been in widespread use. Examples of operations targeting the various types of industrial products include various types of operations such as manufacturing and assembling operations in manufacturing processes and operations (handling operations) performed when the products are used or maintenance operations (maintenance, checking, adjustment, repairing, etc.) for the products. For each of the operations, a predetermined operation procedure, method, and the like may be clearly defined. On the other hand, the operations include manual operations by an operator.

As such operations, a wide variety of operations exist for each of the target products. Each of the operations may require complicated procedures or may require a confirmation operation, as needed. Therefore, to reliably perform a defined operation, the operator entirely and accurately stores a predetermined operation procedure or advances the operation while referring to a manual such as an operating manual.

A strict operation procedure is defined for this type of operation, and the operation procedure may have to be faithfully implemented.

In the case of a washing operation, for example, a series of operations including performing a washing operation for a predetermined site of a target instrument and then performing an observation operation for confirming a washing state of the site is repeated. This type of operation has been required to be cleanly, quickly, and smoothly performed by reducing an opportunity for contamination.

However, skill is required to reliably remember all of a predetermined series of operations and always accurately perform the operations. When the operation is advanced while referring to a manual such as an operating manual, the operation is prevented from being smoothly performed while an operation time period is required.

Various types of operation support systems for supporting an operator when a predetermined operation for which an operation procedure is clearly defined is performed have been proposed by Japanese Patent Application Laid-Open Publication No. 2017-75001, for example.

The operation support system disclosed by Japanese Patent Application Laid-Open Publication No. 2017-75001 is an operation support system for guiding an operation procedure for a mobile crane. The operation support system is configured using a wearable observation apparatus, for example, to correctly guide a predetermined operation procedure for an operator.

The operation support system includes a remote control apparatus including a detection device configured to detect a state of an operating machine, a transmission unit configured to transmit the state of the operating machine detected by the detection device, an operation unit configured to remotely operate the operating machine, a display unit configured to display an operation procedure, and a receiving unit configured to receive the state of the operating machine transmitted by the transmission unit, and is configured such that a defined operation procedure is displayed based on the received state of the operating machine on the display unit provided in the remote control apparatus.

Such a configuration enables, for each operation process, detailed description of a corresponding operation content to be displayed, as needed, on a display screen of the observation apparatus in the above-described operation support system. Thus, even if the operation procedure has not been memorized in advance, the operation procedure can be always accurately performed.

However, in the conventional operation support system disclosed by Japanese Patent Application Laid-Open Publication No. 2017-75001, described above, explanatory information prepared in advance, for example, is merely displayed on the display screen of the observation apparatus.

SUMMARY OF THE INVENTION

The present invention has been made in view of the foregoing and is directed to providing, in an operation support system for supporting a predetermined operation for which an operation procedure is defined, an operation support system capable of preforming evidence recording of each of performed operations, a wearable apparatus, an image pickup apparatus, and an operation support method.

According to an aspect of the present invention, there is provided an operation support system, including a first image pickup apparatus configured to mainly acquire movie data, a second image pickup apparatus configured to mainly acquire still image data, a control apparatus configured to control the first image pickup apparatus and the second image pickup apparatus in cooperation with each other while acquiring operation information about a predetermined operation, and a database storing defined operation information about the predetermined operation in advance, in which the predetermined operation is supported based on image data acquired by causing the first image pickup apparatus and the second image pickup apparatus to cooperate with each other.

According to an aspect of the present invention, there is provided a wearable apparatus, including a first image pickup unit configured to acquire first image data to acquire operation information corresponding to an eye line of an operator, a communication unit configured to acquire second image data from a second image pickup apparatus provided at a different position from a position of the operator, and an operation judgment unit configured to judge the first image data and the second image data according to operation information in a database.

According to an aspect of the present invention, there is provided an image pickup apparatus, including a receiving unit configured to receive information about a first image pickup unit configured to acquire first image data to acquire operation information corresponding to an eye line of an operator by a wearable apparatus, a database storing defined operation information about a predetermined operation in advance, and an operation judgment unit configured to judge image data outputted by the image pickup apparatus and the first image data according to the operation information in the database.

According to an aspect of the present invention, there is provided an operation support method, including acquiring first image data to acquire operation information corresponding to an eye line of an operator, acquiring second image data to acquire operation information different from the operation information corresponding to an eye line of the operator, and judging the first image data and the second image data according to a database storing operation information including image information from a plurality of visual fields relating to a predetermined operation in advance.

According to another aspect of the present invention, there is provided an operation support system, including a wearable terminal apparatus configured to acquire movie data in an image pickup range substantially equivalent to a field of view of an operator and worn by the operator, an auxiliary camera configured to acquire still image data in a predetermined image pickup range including a predetermined object from a different direction from a direction of the wearable terminal apparatus, and a control apparatus configured to control the wearable terminal apparatus and the auxiliary camera in cooperation with each other, in which the auxiliary camera is controlled according to the movie data acquired by the wearable terminal apparatus to acquire still image data serving as evidence of an operation.

According to another aspect of the present invention, there is provided an operation support method, including acquiring movie data in an image pickup range substantially equivalent to a field of view of an operator, and acquiring still image data in a predetermined image pickup range including a predetermined object according to the acquired movie data from a different direction from a direction of the movie data as evidence of an operation.

Objectives and advantages of the present invention will become more apparent from the following detailed description.

According to the present invention, there can be provided, in an operation support system for supporting a predetermined operation for which an operation procedure is defined, an operation support system capable of performing evidence recording of each of performed operations, a wearable apparatus, an image pickup apparatus, and an operation support method.

BRIEF DESCRIPTION OF THE DRAWINGS

FIG. 1 is a schematic block configuration diagram illustrating a configuration of an operation support system according to an embodiment of the present invention;

FIG. 9 is a flowchart illustrating functions of a control apparatus in the operation support system according to the embodiment of the present invention;

FIG. 12 illustrates an example of a database assuming a scissors washing and sterilization operation;

DETAILED DESCRIPTION OF THE PREFERRED EMBODIMENTS

The present invention will be described below according to an illustrated embodiment. The drawings used for the following description schematically illustrate the embodiment. To respectively illustrate components with sufficient sizes to be recognizable on the drawings, a dimensional relationship, a scale, and the like of each member may be made to differ for each of the components. Therefore, the present invention is not limited only to illustrated forms with respect to the number of components described in each of the drawings, a shape of each of the components, a ratio of the respective sizes of the components, a relative positional relationship among the components, and the like.

First Embodiment

First, a schematic configuration of an operation support system according to an embodiment of the present invention will be described below with reference to FIG. 1. FIG. 1 is a schematic block configuration diagram illustrating a configuration of the operation support system according to the embodiment of the present invention.

The operation support system 1 according to the present embodiment is an operation support system which can provide operation support to reliably perform a series of predetermined operations including a plurality of operations according to a defined procedure and method while performing evidence recording relating to each of the performed operations.

Therefore, the operation support system 1 includes a plurality of image pickup apparatuses and a control apparatus configured to control the plurality of image pickup apparatuses in cooperation with one another. Note that the present invention provides an example in which the operation support system 1 includes two image pickup apparatuses (20, 30) and one control apparatus (10), as illustrated in FIG. 1.

By the configuration, the operation support system 1 according to the present embodiment provides operation support based on a collection of information (a database) about a plurality of operations determined in advance and a plurality of image data (acquired image data) about operations actually performed. For example, the operation support system 1 displays an operation content and an operation procedure of each of operations included in a target series of operations to guide the operation, performs confirmation and judgment for each of the operations, for example, whether each of the operations has been correctly performed and whether a correct operation procedure has been executed, and performs evidence recording when the correct operation has been performed while issuing a warning or the like to an operator when the false operation has been performed to force the correct operation.

Figure 2:
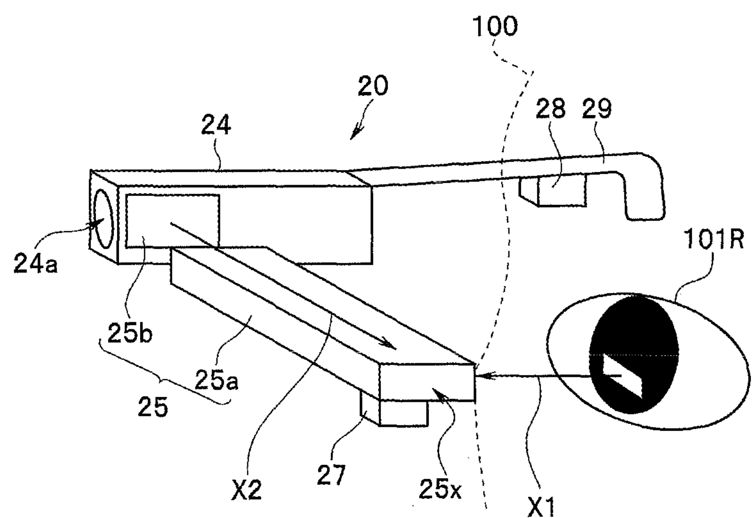
FIG. 2 is a conceptual diagram illustrating a schematic configuration of a first image pickup apparatus (a wearable terminal apparatus) constituting a part of the operation support system according to the embodiment of the present invention.

More specifically, the operation support system 1 according to the present embodiment includes the two image pickup apparatuses, i.e., a wearable terminal apparatus 20 serving as a first image pickup apparatus and also being a wearable apparatus and an auxiliary camera 30 serving as a second image pickup apparatus and the control apparatus 10 configured to control the two image pickup apparatuses in cooperation with each other. Note that a specific configuration example is illustrated in FIG. 2 for the wearable terminal apparatus 20.

The control apparatus 10 controls each of the two image pickup apparatuses (20, 30), confirms and judges each of the performed operations based on image data (still image data (second image data), movie data (first image data), etc.) acquired by each of the image pickup apparatuses (20, 30), and controls an operation such as operation recording (evidence recording). The control apparatus 10 performs control, for example, to operate the two image pickup apparatuses (20, 30) in cooperation with each other.

Therefore, the control apparatus 10 includes a control unit 11, a communication unit 12, a database 13, an evidence recording unit 14, and the like.

Note that the control apparatus 10 according to the present embodiment includes various types of components provided in a general control apparatus, for example, an operation unit and a display unit in addition to the above-described components, illustration of which is omitted. Since the various types of components, illustration of which is omitted, are not directly related to the present invention, detailed description of the components is omitted.

The control unit 11 is a constituent unit including a plurality of control circuits, for example, configured to integrally control the entire operation support system 1 according to the present embodiment. Examples of the plurality of control circuits included in the control unit 11 include, particularly, an operation judgment unit 11*a*, a display control unit 11*b*, a guide unit 11*c*, an object judgment unit 11*d*, and a size judgment unit 11*e*.

The operation judgment unit 11*a* is a constituent unit including a control circuit, for example, configured to confirm and judge each of items relating to the performed operation based on the image data acquired by the two image pickup apparatuses (20, 30), information stored in the database 13 in advance, judgment result information acquired by the object judgment unit 11*d* and the size judgment unit 11*e*, and the like.

Note that examples of the judgment herein performed include judgment of the type of a tool used for each of operations and judgment of the type of the operation.

The display control unit 11*b* is a constituent unit including a control circuit, for example, configured to control a display unit (not illustrated) included in the control apparatus 10 or a display unit (25) and a display unit (not illustrated) respectively included in the plurality of (two) image pickup apparatuses (20, 30) cooperating with the control apparatus 10 to perform predetermined display (warning display, etc. in addition to image display).

The guide unit 11*c* is a constituent unit including a control circuit, for example, configured to generate guide information for performing guide display relating to a performed operation, guide display for an operation to be next performed, and the like based on the image data acquired by the two image pickup apparatuses (20, 30) and the information stored in the database 13 in advance.

The object judgment unit 11*d* and the size judgment unit 11*e* are each a constituent unit including a control circuit, for example, configured to detect and judge, based on the image data acquired by the two image pickup apparatuses (20, 30) and the information stored in the database 13 in advance, predetermined conditions such as a type, a site, a shape, a size, a number, and a state of a predetermined object included in the image data. Note that as size judgment means, means for calculating the size of an object formed on a light receiving surface of an image pickup device from a relationship between a distance between the image pickup apparatus and the object and a size of the image pickup device using an automatic focus mechanism, for example, can also be used in addition to the above.

The communication unit 12 is a transmission unit and a receiving unit including a control circuit, for example, configured to perform data communication (transmission and receiving of information) between the respective communication units (22, 32) in the two image pickup apparatuses (20, 30). The communication unit 12 may have a configuration using wireless communication or a configuration using wired communication.

The database 13 is a storage device (auxiliary storage device) storing various types of information determined in advance. In the present embodiment, an example in which the database 13 is included in the control apparatus 10 (more specifically, an internally fixed storage medium (a built-in memory, etc.) or a removable storage medium (a removable card-type memory, etc.), for example) is illustrated. However, the configuration of the database 13 is not limited to such forms. For example, the database may be configured by an external storage device in an independent form. Note that in this case, an area between the database having an independent configuration and the control apparatus 10 may be configured to enable transmission and receiving of various types of data using predetermined connection means by wireless or wire.

The database 13 stores an operation information database 13*a* and an image database 13*b*, for example. The operation information database 13*a* includes various types of information about a plurality of operations (object information, used tool information, operation type information, etc.). The image database 13*b* is a collection of image data associated with various types of information recorded on the operation information database 13*a* (e.g., image information from a plurality of visual fields relating to a plurality of operations) (details are described below; see FIG. 12).

The evidence recording unit 14 is a constituent unit including a control circuit and the like and a storage medium and the like each configured to record the image data and the like acquired by the two image pickup apparatuses (20, 30) and operation information associated with the image data in association with each other. Needless to say, images from more visual fields, fields of view, and viewpoints may be enabled to be referred to.

The first image pickup apparatus out of the two image pickup apparatuses (20, 30) is the wearable terminal apparatus 20. The wearable terminal apparatus 20 is an image pickup apparatus in such a form that frees both hands of the operator by wearing the wearable terminal apparatus 20 on a part of the body (e.g., the vicinity of the face) and at the same time a state in the vicinity of the hands of the operator can be always picked up, as illustrated in FIG. 2, for example.

In other words, the wearable terminal apparatus 20 is an image pickup apparatus in a form capable of acquiring operation information corresponding to the eye line of the operator.

The wearable terminal apparatus 20 mainly acquires the movie data serving as the first image data. The movie image data is used for grasping a frequent flow of operations by the operator, and may be a still image in which a time change can be found or data information, representing a time change of an image, such as a motion vector extracted from the still image. The movie image data is preferably a still image, which can be verified later by a person, when used for evidence.

Figure 3:
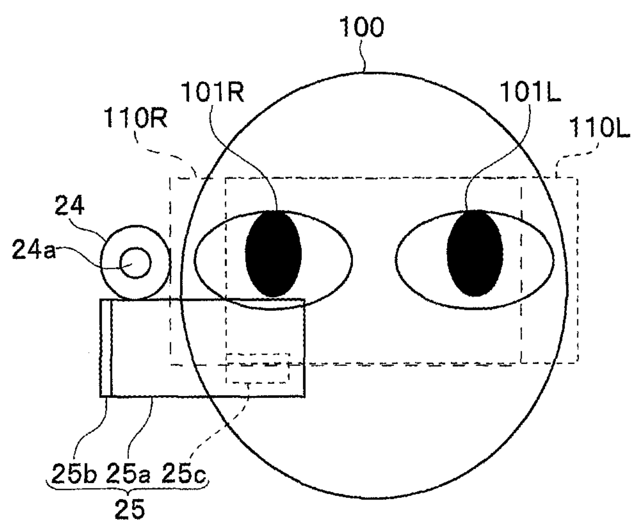
FIG. 3 is a conceptual diagram illustrating a frontal view of an operator's face with the operator wearing the first image pickup apparatus (the wearable terminal apparatus) and simultaneously illustrating a field of view by both the eyes of the operator.
Figure 4:
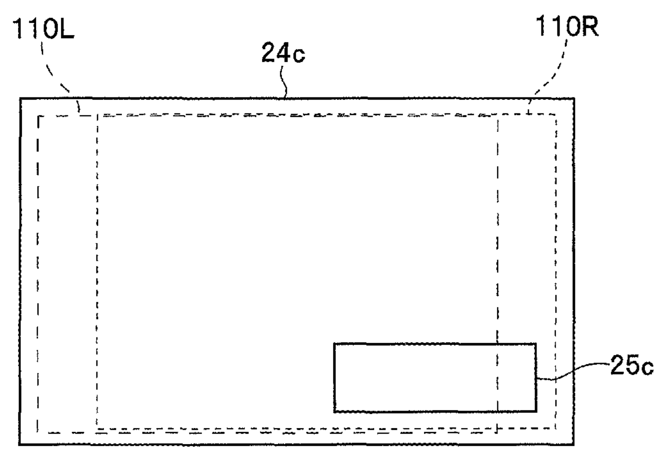
FIG. 4 is a conceptual diagram more specifically illustrating the field of view by both the eyes of the operator illustrated in FIG. 3.

FIG. 2 is a conceptual diagram illustrating a schematic configuration of the first image pickup apparatus (the wearable terminal apparatus) constituting a part of the operation support system according to the present embodiment. Note that FIG. 2 supposes a state where the operator is wearing the first image pickup apparatus (wearable terminal apparatus). FIG. 3 is a conceptual diagram illustrating a frontal view of an operator's face with the operator wearing the first image pickup apparatus (the wearable terminal apparatus) and simultaneously illustrating a field of view by both the eyes of the operator. FIG. 4 is a conceptual diagram more specifically illustrating a field of view of both the eyes of the operator illustrated in FIG. 3.

In the present embodiment, the wearable terminal apparatus 20 is an image pickup apparatus which individually functions under the control of a control unit 21, and simultaneously also functions under the control of the control unit 11 in the control apparatus 10 by communicating with the control apparatus 10.

Note that, while the wearable terminal apparatus 20 according to the present embodiment is an image pickup apparatus configured to mainly acquire movie data, the present invention is not limited to this. For example, the wearable terminal apparatus 20 may be configured to be able to optionally or automatically acquire still image data simultaneously with movie data or independently acquire still image data using a predetermined operation by the operator or using a predetermined action as a trigger.

The wearable terminal apparatus 20 includes the control unit 21, the communication unit 22, an operation unit 23, an image pickup unit 24 (a first image pickup unit), a display unit 25, a voice input unit 27, a voice output unit 28, a support unit 29, and the like.

The control unit 21 is a constituent unit including a control circuit, for example, configured to integrally control the entire wearable terminal apparatus 20. The control unit 21 is composed of a processor using a CPU (central processing unit), for example. The control unit 21 controls each of the constituent units by operating according to a program stored in a memory (not illustrated).

That is, the control unit 21 performs various types of control, for example, controls the communication unit 22 to transmit and receive (communicate) various types of information to and from the control apparatus 10, controls each of the constituent units upon receipt of an operation input from the operation unit 23, controls the image pickup unit 24 to acquire image data and the like, controls the display unit 25 to display various types of information on a screen of a display panel 25*b* (described below; see FIG. 2), controls the voice input unit 27 to receive an input of voice information, and controls the voice output unit 28 to output voice information.

In addition to the various types of control, the control unit 21 controls the wearable terminal apparatus 20 in cooperation with the control apparatus 10 upon receipt of a control signal from the control unit 11 in the control apparatus 10.

The control unit 21 includes a plurality of circuit units such as an image judgment unit 21*b* and a display control unit 21*c*.

The image judgment unit 21*b* is a judgment processing circuit configured to perform predetermined judgment based on the image data acquired by the image pickup unit 24. The image judgment unit 21*b* is a circuit unit which is equivalent to the various types of judgment units (11*a*, 11*d*, and 11*e*) included in the control unit 11 in the control apparatus 10 or is simple.

That is, the image judgment unit 211*b* functions as an operation judgment unit configured to judge the first image data and the second image data according to the operation information in the database 13. Therefore, if the control unit 11 in the control apparatus 10 is provided with the various types of judgment units (11*a*, 11*d*, and 11*e*), the image judgment unit 21*b* can also be omitted.

If the image judgment unit 21*b* is provided on the side of the wearable terminal apparatus 20, only a judgment result by the image judgment unit 211*b* may be transmitted to the control unit 11 in the control apparatus 10 via the communication units (22, 12). The control unit 11 in the control apparatus 10 performs control based on received judgment result information upon receipt of the judgment result. Therefore, the configuration has the advantage that a communication load can be reduced.

The display control unit 21*c* is a control circuit unit configured to control the display unit 25 to perform predetermined display on the display panel 25*b* (see FIG. 2).

The communication unit 22 is a transmission unit and a receiving unit including a control circuit, for example, configured to perform communication (transmission and receiving of information) with the control apparatus 10. Predetermined communication means by wireless or wire is applied to the communication unit 22. The communication unit 22 also functions as a communication unit configured to acquire the second image data from the second image pickup apparatus (the auxiliary camera 30) provided at a position different from a position of the operator 100 (or the wearable terminal apparatus 20 serving as the first image pickup apparatus) via the control apparatus 10.

Further, the communication unit 22 can also refer to the operation information in the database 13 by communicating with the database 13 via the control apparatus 10. Note that the communication unit 22 and the database 13 may directly communicate with each other.

The operation unit 23 is a constituent unit (a specific configuration of the constituent unit is not illustrated) including a plurality of operation members configured to operate the wearable terminal apparatus 20 and a plurality of electrical components respectively corresponding to the plurality of operation members and configured to each generate a predetermined operation input signal.

The image pickup unit 24 is a constituent unit including an image pickup optical system 24*a* (see FIG. 2) and an image pickup device and a control circuit for driving the image pickup device (not illustrated). The image pickup unit 24 has functions, for example, of sequentially photoelectrically converting an optical image to be picked up formed by the image pickup optical system 24*a* using the image pickup device and sequentially displaying an image based on image data thus obtained on the display panel 25*b* in the display unit 25. The image pickup unit 24 has functions, for example, of forming image data (e.g., movie data or still image data) in a predetermined form based on an obtained image signal, recording the image data, and transmitting the image data to the control apparatus 10 via the communication units 22, 12. A configuration of the image pickup unit 24 having such functions is substantially similar to a configuration of an image pickup unit in a conventionally general image pickup apparatus. Therefore, a specific configuration and illustration of the image pickup unit 24 are omitted.

Note that photoelectric conversion elements such as a CCD (charge coupled device) image sensor and a CMOS (complementary metal oxide semiconductor) image sensor are applied as the image pickup device. In the image pickup unit, an image close to an eye line (a field of view and a visual field) of an operator in operation is obtained, and a specific operation (including a visual check) using both hands performed between both the hands is easily confirmed.

The display unit 25 is a constituent unit including a display control circuit, for example, configured to enable various types of warning display or various types of predetermined message display or guide display (details are described below) by overlapping the display with an image in addition to displaying an image based on the image data acquired by the image pickup unit 24 while performing menu display and the like for various types of settings in the wearable terminal apparatus 20 by switching a predetermined operation mode, as needed.

The display unit 25 includes a light guiding unit 25*a*, a display panel 25*b*, and the like. The display panel 25*b* is a constituent unit including a display screen on which various types of display are to be performed and a display control circuit or the like for implementing the display. An LCD (liquid crystal display) unit and an OEL (organic electro-luminescence) display unit, for example, are applied as the display panel 25*b*.

The light guiding unit 25*a* is a constituent unit configured to guide an image displayed on the display panel 25*b* to a predetermined display surface.

The display panel 25*b* in the wearable terminal apparatus 20 according to the present embodiment is installed to be directed toward a different direction from a direction of a surface opposing an eye direction (a direction indicated by an arrow X1 in FIG. 2) of the operator, for example, as illustrated in FIG. 2.

More specifically, the eye direction of the operator is indicated by an arrow X1, and a direction toward which the display surface of the display panel 25*b* is directed is indicated by an arrow X2 in FIG. 2, for example. In this case, the light guiding unit 25*a* is provided such that a direction of the long axis matches the direction indicated by the arrow X2 in FIG. 2. Therefore, light forming an image on the display surface of the display panel 25*b* is guided toward the direction indicated by the arrow X2 by the light guiding unit 25*a*.

In the light guiding unit 25*a*, a light bending member (a prism, etc.) configured to bend the above-described light guided toward the direction indicated by the arrow X2 by the light guiding unit 25*a* and guide the bent light in the direction indicated by the arrow X1 is disposed at one end (see a reference sign 25*x*) of the light guiding unit 25*a*. Therefore, light emitted from the display surface of the display panel 25*b* is guided toward the direction indicated by the arrow X2 in the light guiding unit 25*a*, and is displayed at a position (see a reference sign 25*c* in FIG. 3) which can be visually recognized by one of the eyes of the operator via the prism or the like.

The voice input unit 27 is a constituent unit including an electrical component configured to input voice information, a driving circuit configured to drive the electrical component, and the like. The voice input unit 27 is controlled by the control unit 21, to collect voice information under an ambient environment at a predetermined timing. As the voice input unit 27, a microphone, for example, is applied.

As an arrangement of the voice input unit 27, the voice input unit 27 is desirably arranged in the vicinity of the mouth of the operator when the operator wears the wearable terminal apparatus 20, for example (see FIG. 2). Such an arrangement enables the operator to reliably perform a voice input to the voice input unit 27.

The voice output unit 28 is a constituent unit including an electrical component configured to output voice information, a driving circuit configured to drive the electrical component, and the like. The voice output unit 28 is controlled by the control unit 21, to output voice information (e.g., voice information and a voice guide such as a warning and a message) at a predetermined timing. As the voice output unit 28, a sound production device such as a speaker is applied.

As an arrangement of the voice output unit 28, the voice output unit 28 is desirably arranged in the vicinity of the ear of the operator when the operator wears the wearable terminal apparatus 20, for example (see FIG. 2). Such an arrangement enables the operator to reliably catch a voice output from the voice output unit 28.

The support unit 29 (see FIG. 2) is a frame member configured such that each of the constituent units in the wearable terminal apparatus 20 is assembled thereinto while being wearable on a part of the body (e.g., the vicinity of the face) of the operator. The configuration example of the support unit 29 illustrated in FIG. 2 is an example in which the support unit 29 is formed in a so-called glass frame shape.

Note that the wearable terminal apparatus 20 in the present embodiment includes a battery serving as a power source, although not illustrated. The battery generates electric power required to drive the wearable terminal apparatus 20, and is controlled by the control unit 21, to supply the electric power to each of the constituent units.

FIGS. 2 and 3, for example, illustrate how the operator wears the wearable terminal apparatus 20 thus configured.

In FIG. 3, the right eye and the left eye of the operator 100 are respectively denoted by a reference sign 101R and a reference sign 101L. In FIGS. 3 and 4, a right eye visual field by the right eye 101R and a left eye visual field by the left eye 101L are respectively indicated by a dotted frame denoted by a reference sign 110R and a dotted frame denoted by a reference sign 110L.

In this case, the operator 100 wears the support unit 29 in the wearable terminal apparatus 20 on the vicinity of the right eye (of the operator 100), for example.

Thus, when the wearable terminal apparatus 20 is being worn, an image pickup optical system 24*a* in the image pickup unit 24 is directed toward a direction which substantially matches the eye direction of the operator (the direction indicated by the arrow X1). When the eye direction is changed by turning the head of the operator 100, for example, with the wearable terminal apparatus 20 worn, a direction toward which the image pickup optical system 24*a* in the image pickup unit 24 is directed is changed by following the eye direction. Therefore, image data acquired by the image pickup unit 24 with the wearable terminal apparatus 20 worn by the operator 100 becomes a predetermined area including a direction in which the operator is seeing the image data (an eye direction). An image pickup area of the image data acquired by the image pickup unit 24 is a frame line denoted by a reference sign 24*c* in FIG. 4. The image pickup area 24*c* can be optionally set by an angle of view of the image pickup optical system 24*a*. In the present embodiment, the image pickup area 24*c* is set to be an area including the right eye visual field 110R and the left eye visual field 110L of the operator 100.

Further, with the wearable terminal apparatus 20 worn by the operator 100, display by the display panel 25*b* in the display unit 25 is performed in a predetermined area denoted by a reference sign 25*c* in FIGS. 3 and 4 within the right eye visual field 110R of the operator 100 via the light guiding unit 25*a*. The display area 25*c* is an area in such a form as to be visually recognizable in a part of the whole of both the right and left visual fields (110R, 110L) of the operator 100 and formed enough not to inhibit the visual field of the operator 100. The operator 100 can visually recognize the whole of both the right and left visual fields (110R, 110L) while closely observing the display area 25*c* by performing eye movement and visually recognizing a display content of the display unit 25.

On the other hand, the other second image pickup apparatus out of the two image pickup apparatuses (20, 30) is the auxiliary camera 30. The auxiliary camera 30 is an image pickup apparatus in a general form or an image pickup apparatus placed or fixedly installed at a predetermined position in the vicinity of an operation table (not illustrated). In other words, the auxiliary camera 30 is an image pickup apparatus in such a form as to be able to acquire operation information different from the operation information corresponding to the eye line of the operator.

The auxiliary camera 30 preferably has information about a so-called objective standpoint from a visual field different from a visual field of the image through the eye line of the operator (becomes rich in information as a system), and mainly acquires the still image data serving as the second image data. When the auxiliary camera 30 is used for evidence, a still image, which can be verified later by a person, is preferable. However, the still image becomes a movie if continuously acquired. Therefore, the auxiliary camera 30 may be thus applied if it has no problem even in consumed energy and a recording capacity.

A configuration of the auxiliary camera 30 is substantially similar to a configuration of an image pickup apparatus in a general form. For example, the auxiliary camera 30 includes at least the control unit 31, the communication unit 32, an image pickup unit 34 (a second image pickup unit), and the like, as illustrated in FIG. 1.

The control unit 31 is a constituent unit including a control circuit, for example, configured to integrally control the entire auxiliary camera 30. The control unit 31 is composed of a processor using a CPU, for example. The control unit 31 controls each of the constituent units by operating according to a program stored in a memory (not illustrated).

The control unit 31 performs various types of control. For example, the control unit 31 controls the communication unit 32 to transmit and receive (communicate) various types of information to and from the control apparatus 10, and controls the image pickup unit 34 to acquire image data and the like. In addition to the various types of control, the control unit 31 controls the auxiliary camera 30 in cooperation with the control apparatus 10 upon receipt of a control signal from the control unit 11 in the control apparatus 10.

The communication unit 32 is a transmission unit and a receiving unit including a control circuit, for example, configured to perform communication (transmission and receiving of information) with the control apparatus 10. Predetermined communication means by wireless or wire is applied to the communication unit 32.

Note that the communication unit 32 can also refer to the operation information in the database 13 by communicating with the database 13 via the control apparatus 10. The communication unit 32 and the database 13 may directly communicate with each other.

The image pickup unit 34 is a constituent unit including an image pickup optical system and an image pickup device and a control circuit for driving the image pickup device (not illustrated). The image pickup unit 34 has functions such as a function of sequentially photoelectrically converting an optical image of an object to be picked up formed by the image pickup optical system using the image pickup device and transmitting image data thus obtained to the control apparatus 10 via the communication unit 32. The image pickup unit 34 simultaneously has a function of sequentially displaying an image based on the image data using a display unit (not illustrated).

A configuration of the image pickup unit 34 having such functions is substantially similar to the configuration of the above-described wearable terminal apparatus 20 or the image pickup unit in the conventionally general image pickup apparatus. For example, the image pickup unit 34 also includes constituent members (an operation unit, a display unit, a battery, etc.) included in an image pickup apparatus in a conventionally general form, illustration of which is omitted in FIG. 1. The constituent members each have a similar configuration and function to a configuration and function of the image pickup apparatus in the conventionally general form, and hence detailed description is omitted.

Note that the control unit 31 may also be provided with an image judgment unit (operation judgment unit) in the auxiliary camera 30. If the control unit 31 in the auxiliary camera 30 is provided with the image judgment unit, the auxiliary camera 30 may transmit only a judgment result by the image judgment unit to the control unit 11 in the control apparatus 10 via the communication units (32, 12), like when the control unit 21 in the wearable terminal apparatus 20 is provided with the image judgment unit 21*b*. Upon receipt of the judgment result, the control unit 11 in the control apparatus 10 performs control based on information about the received judgment result. Therefore, the configuration has the advantage that a communication load can be reduced.

The auxiliary camera 30 thus configured is fixedly arranged in the vicinity of an operation place when the operator performs a predetermined operation. In this case, the auxiliary camera 30 is arranged at a position where an object to be an operation target and the vicinity of the hand of the operator who handles the object are included in at least the image pickup area. Further, the auxiliary camera 30 may be more preferably arranged such that an entire image of the operator is included in the image pickup area to be able to confirm how the operator is operating. Thus, a different image from an image through the eye line of the operator is obtained.

Functions performed using the operation support system 1 according to the present embodiment thus configured will be described below.

Although various types of operations in various types of fields can be assumed as an operation performed using the operation support system 1 according to the present embodiment, a maintenance operation relating to washing or the like of a predetermined medical instrument among operations for handling medical instruments will be described below as a specific example of the operation in the following description. More specifically, an operation for washing and sterilizing a surgical instrument or a treatment tool (e.g., an instrument in the shape of scissors, which is abbreviated as scissors) serving as a medical instrument already used (hereinafter referred to as an instrument washing and sterilization operation) is illustrated.

Figure 5:
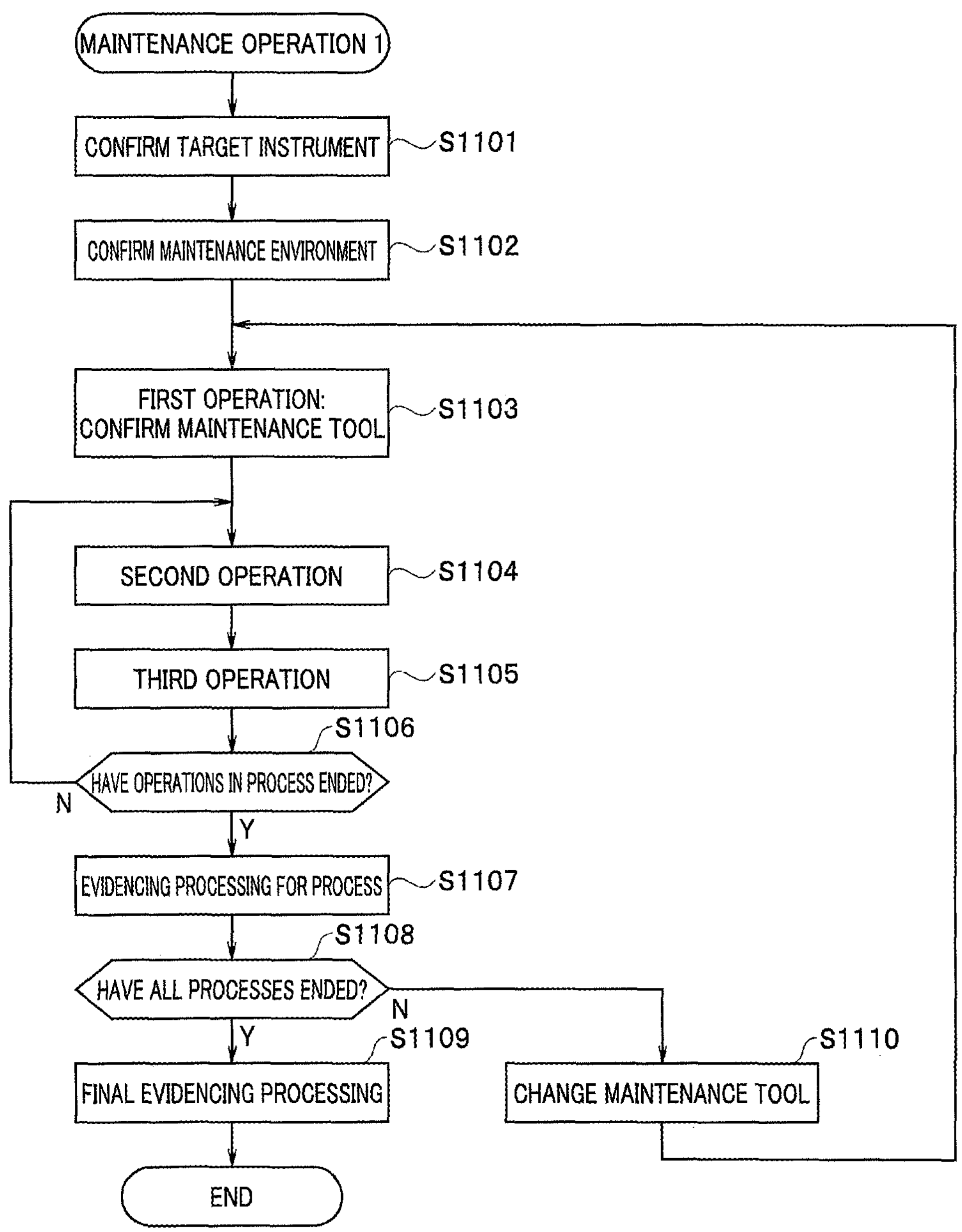
FIG. 5 is a flowchart illustrating a flow of operations performed by an operator in a maintenance operation (an instrument washing and sterilization operation) for a medical instrument.

First, a schematic flow of an instrument washing and sterilization operation generally performed will be simply described with reference to a flowchart of FIG. 5. FIG. 5 is a flowchart illustrating a flow of operations performed by an operator in a maintenance operation (an instrument washing and sterilization operation) for a medical instrument.

In step S1101, an operator first confirms an object (an instrument) serving as a maintenance operation target in a normal instrument washing and sterilization operation, as illustrated in FIG. 5.

In step S1102, the operator then confirms a state of a maintenance environment. The maintenance environment is an environment in a location (a room, a table, etc.) where the operation is to be performed. The confirmation of the state of the environment is confirmation whether the environment is in a clean state, i.e., whether the environment is in a state appropriate for the instrument washing and sterilization operation. In a normal case, a dedicated maintenance environment (a room, a table, etc.) is prepared.

In step S1103, the operator then performs a first operation in a first process in the maintenance operation.

The maintenance operation is considered as a series of operations which is established when a plurality of processes each serving as a collection of a plurality of operations are performed. That is, the one predetermined maintenance operation is established when the plurality of operation processes are executed in a predetermined procedure. Each of the plurality of operation processes further includes a plurality of specific operational actions. When the plurality of operations are performed in a predetermined procedure, each of the operation processes is established.

Examples of the first operation in the first process include an operation for confirming a maintenance tool in step S1103. Examples of the maintenance tool include a washing brush for washing an instrument. In this case, a plurality of types of washing brushes are prepared as the maintenance tool. Appropriate tools are prepared to be optimized for each maintenance target instrument or depending on a target site in a predetermined instrument, and the most appropriate tool needs to be selected for each of the processes in the maintenance operation and for each of the operations. Thus, a used tool needs to be confirmed before each of the operations.

In step S1104, the operator then performs a second operation in the first process. Note that, while the second operation is an operation for washing a predetermined first site of a maintenance target instrument (e.g., a specific site such as a blade portion of scissors), for example, specific illustration of the second operation is omitted.

In step S1105, the operator then performs a third operation in the first process. Note that the third operation is similarly an operation for washing a predetermined second site different from the first site of the maintenance target instrument (e.g., a specific site such as a joint portion of scissors), for example, specific illustration of the third operation is omitted.

In step S1106, the operator then confirms whether the plurality of operations defined in the first process have ended. In an example of the operations illustrated in the flowchart of FIG. 5, the first process is completed in the first to third operations.

Therefore, when the operations in the first process have not ended at this time point, the processing returns to step S1104, described above. In step S1104 and subsequent steps, similar processing is repeated. When it is confirmed that all the operations in the first process have ended, the processing proceeds to step S1107, described below.

In step S1107, the operator then performs evidencing processing relating to each of the operations in the first process. The evidencing processing is an operation for the operator to confirm that each of the operations in the first process has been completed and clearly indicate the confirmation as evidence. More specifically, examples of the evidencing processing include confirmation whether the operator has executed operation items to be confirmed which are listed in advance for each of the operations and creation of a check list to be recorded.

In step S1108, the operator then confirms whether all the operation processes in the maintenance operation (the instrument washing and sterilization operation) have ended. If it is confirmed that all the operation processes have not ended, the processing proceeds to step S1110. If it is confirmed that all the operation processes have ended, the processing proceeds to step S1109.

In step S1110, the operator performs an operation for changing a maintenance tool which the operator currently has into a maintenance tool used in the subsequent operation process. The processing returns to step S1103, described above.

On the other hand, if it is confirmed that all the operation processes have ended, the processing proceeds to step S1109. In step S1109, the operator performs final evidencing processing for the maintenance operation (the instrument washing and sterilization operation). Examples of the final evidencing processing include an operation for compiling check lists respectively created for the processes while creating a comprehensive and final operation check list and compiling the check list as evidence information.

Figure 6:
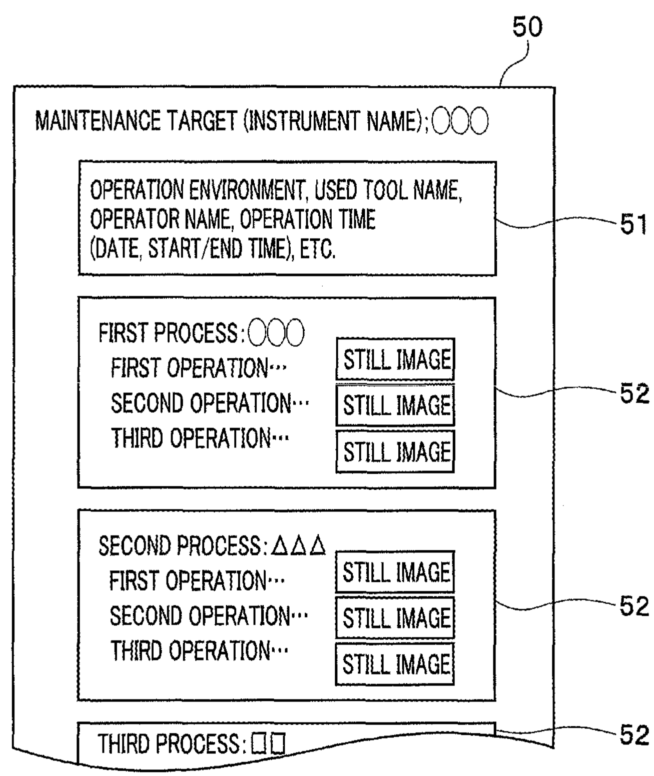
FIG. 6 is a diagram illustrating an example of evidence information generated by the maintenance operation.

The above-described evidence information is a document in a list format into which a plurality of information are compiled in a predetermined form, as illustrated in FIG. 6, for example. Note that the evidence information may be in a document format in such a form as to be printed on a sheet surface or in a so-called electronic file format in an electronic form, for example. FIG. 6 is a diagram illustrating an example of evidence information generated by a maintenance operation.

Examples of the evidence information include a data collection in a list format obtained by listing information (index information) about instruments to be maintained, a plurality of operation processes determined for each of the instruments to be maintained, information about a plurality of operation contents to be performed in each of the operation processes, a plurality of confirmation items corresponding to each of the operation contents, and the like.

Examples of the plurality of confirmation items included in the evidence information include an ambient environment (e.g., an operation room, an operation table, etc.) in which an operation is performed, a name of a tool used for the operation, a name of an operator, and a time period (a date, a start/end time, etc.) for the operation. The plurality of confirmation items are determined in advance for each of the plurality of operations in each of the operation processes. In addition to a list of the confirmation items, a plurality of image (still image and movie) data acquired during each of the operations are recorded as evidence information, and image data respectively corresponding to the confirmation items are recorded in association with one another.

Particularly, a still image is easily left in writing and easily kept as a material, and is thus important as evidence. By movie information, evidence in a still image at an optimum timing is obtained. When movie data in an image pickup range substantially equivalent to a field of view of the operator is acquired, the operator can detect meticulous movement while confirming the movie data. That is, the operation can be confirmed based on grasp of a situation including an intension of the operator and a confidence in the operation.

Therefore, a wearable terminal apparatus (first image pickup apparatus) to be worn by the operator is provided, and an auxiliary camera (second image pickup apparatus) for acquiring, to acquire information, which is insufficient by only shooting in the same direction as a direction of the wearable terminal apparatus, still image data in a predetermined image pickup range including a predetermined object in a different direction from the direction, to increase an amount of information and cause evidence of the information amount to have diversity. That is, there can be provided an operation support system including a control apparatus configured to control the first image pickup apparatus and the second image pickup apparatus in cooperation with each other while acquiring operation information about a predetermined operation and configured to control the auxiliary camera to acquire still image data serving as evidence of the operation according to movie data as almost viewed by the operator.

Conventionally, image data or the like recorded as evidence information has been acquired by a manual operation of an operator every time in a series of operations, each of the operations is completed. In the operation support system 1 according to the present embodiment, the evidence information including the image data or the like is configured to be automatically recorded.

Figure 7:
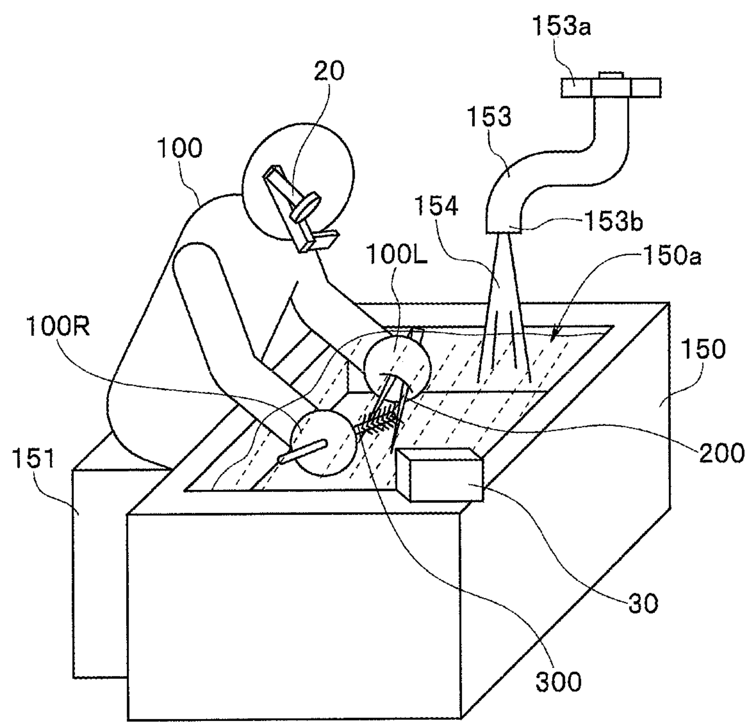
FIG. 7 is a conceptual diagram illustrating how a predetermined maintenance operation (the instrument washing and sterilization operation) is being performed using the operation support system according to the embodiment of the present invention.

Functions at the time when the operation support system 1 according to the present embodiment is used will be described below. FIG. 7 is a conceptual diagram illustrating how a predetermined maintenance operation (instrument washing and sterilization operation) is being performed using the operation support system according to the present embodiment.

As illustrated in FIG. 7, when the maintenance operation (instrument washing and sterilization operation) illustrated as an example in the present embodiment is performed, an operator 100 performs an operation while sitting on a chair 151 at an operation table 150 installed within a predetermined operation room. At this time, the operator 100 remains wearing the wearable terminal apparatus 20 in the vicinity of the face. Thus, the wearable terminal apparatus 20 acquires image data (mainly movie data) in a predetermined area including an eye direction of the operator 100.

On the operation table 150, the auxiliary camera 30 is placed to be directed toward the operator 100. The auxiliary camera 30 acquires image data in a predetermined area including at least the vicinity of the hand of the operator 100. Note that the auxiliary camera 30 desirably has a waterproof function in consideration of use in plumbing.

Illustration of the control apparatus 10, which cooperates with the two image pickup apparatuses (20, 30), is omitted in FIG. 7. The reason is that the control apparatus 10 is installed in a distant place because an operation place for the operation illustrated as an example in the present embodiment is in the vicinity of plumbing.

The maintenance operation (instrument washing and sterilization operation) herein illustrated as an example is an operation for washing and sterilizing scissors 200 serving as a surgical instrument, a treatment tool, or the like serving as a used surgical instrument. Therefore, the operation table 150 includes a washing tank 150*a*. Further, a faucet 153 is installed above the washing tank 150*a*. When a handle 153*a* in the faucet 153 is operated to rotate in an opening direction, running water 154 flows out of a running water port 153*b*.

The operator 100 brushes and washes an instrument (the scissors 200) to be maintained using a predetermined tool (the washing brush 300) in a washing liquid (e.g., water) stored in the washing tank 150*a*.

Figure 8:
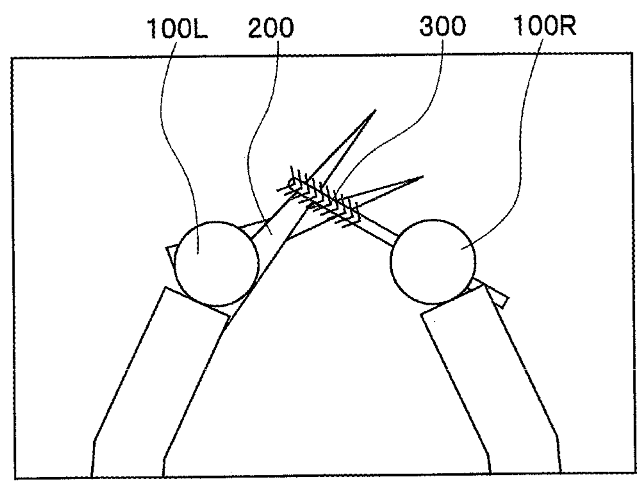
FIG. 8 illustrates a display example of an image based on image data acquired by the wearable terminal apparatus during the maintenance operation (the instrument washing and sterilization operation) using the operation support system according to the embodiment of the present invention.

In this case, image data acquired by the wearable terminal apparatus 20 becomes an image as illustrated in FIG. 8, for example. FIG. 8 illustrates a display example of an image based on image data acquired by the wearable terminal apparatus during the maintenance operation (instrument washing and sterilization operation) using the operation support system according to the present embodiment.

The display example of the image illustrated in FIG. 8 indicates how the operator 100 holds the maintenance target instrument (the scissors 200) in hand (left hand 100L) and is performing a brushing and washing operation using the predetermined tool (the washing brush 300) in the other hand (right hand 100R). At this time, the wearable terminal apparatus 20 picks up an area in the vicinity of the hand of the operator 100.

Functions at the time when a predetermined maintenance operation (instrument washing and sterilization operation) is performed will be described below using the operation support system 1 according to the present embodiment.

As described above, the operation support system 1 according to the present embodiment is a system which functions by causing the two image pickup apparatuses (the wearable terminal apparatus 20 and the auxiliary camera 30) to cooperate with each other when the operator 100 performs a predetermined operation.

The outline of the functions of the operation support system 1 according to the present embodiment will be described below.

In the operation support system 1 according to the present embodiment, the two image pickup apparatuses (20, 30) each pick up a situation of a plurality of operations sequentially performed by the operator 100, as needed. Each of image data thus acquired is transmitted to the control apparatus 10.

The control apparatus 10 receives the image data respectively acquired by the two image pickup apparatuses (20, 30), and performs predetermined judgment processing based on the image data and various types of information stored in a database in advance. Examples of the judgment processing performed by the control apparatus 10 include a plurality of confirmation items defined depending on a target operation content, e.g., judgment of a maintenance target instrument, judgment of the type of a used tool, and judgment of an operational action (brushing, washing, scraping, agent spraying, etc.).

The control apparatus 10 performs various types of control processing based on the above-described judgment processing result. For example, if it is judged as a judgment result that the performed operational action matches a defined operation (is a correct operation), the control apparatus 10 performs evidence recording in addition to creating a confirmation check table, for example. Examples of the evidence recording include processing for recording information included in the evidence information illustrated in FIG. 6, for example.

If it is judged as a judgment result that the performed operational action is out of the defined operation (is an operation error), warning display indicating that the operational action is out of the defined operation, for example, is performed while guide display for performing the correct operation again, for example, is performed.

Note that a specific information content included in the operation information database 13*a* is illustrated as an example in FIG. 12. The example illustrated in FIG. 12 is an example of a database assuming a maintenance operation performed when "scissors" serving as one type of instrument used for surgery, treatment, or the like are washed using a manual operation of an operator after being used by surgery, treatment, or the like (abbreviated as a scissors washing and sterilization operation below).

As illustrated in FIG. 12, in the operation information database, a maintenance target column [A] is a name of a maintenance target instrument. In this example, information specified as "target 1: scissors" is recorded, and the information indicates a maintenance operation of scissors washing and sterilization. Note that, while a name of another instrument enters "target 2:000", detailed illustration other than information about the "target 1" is omitted in FIG. 12.

In the operation information database illustrated in FIG. 12, an operation process column [B] lists examples of a plurality of operation processes included in the maintenance operation in the order of operations. Examples of the operation processes included in the scissors washing and sterilization operation include "first process: brushing" process, "second process: running water washing" process, "third process: scraping" process, and "fourth process: agent sterilization" process.

The "first process: brushing" process is a process for brushing a target instrument (here, the scissors) in a predetermined water tank or the like using a predetermined tool (e.g., a brush).

The "second process: running water washing" process is a process for water-washing the scissors in running water.

The "third process: scraping" process is a process for scraping the scissors using a predetermined tool (e.g., paper or a cloth) to wipe water or dirt.

The "fourth process: agent sterilization" process is a process for (spraying and) sterilizing the scissors using a predetermined agent (e.g., alcohol).

An example herein illustrated is an example of a "scissors washing and sterilization operation". Therefore, the respective types of and the number of processes to be performed differ depending on a target instrument.

In the operation information database illustrated in FIG. 12, an operation content column [C] lists examples of a plurality of operations included in each of the operation processes in the order of operations.

Examples of operations included in the "first process: brushing" process in the scissors washing and sterilization operation include "tool confirmation" operation serving as a "first operation", "first site brushing" operation serving as a "second operation, and "second site brushing" operation serving as a "third operation".

Specific information about each of the operations is recorded in a next operation information column "D".

That is, in the operation information database illustrated in FIG. 12, the operation information column [D] records specific information (e.g., character data or image data) for clearly indicating each of the operations. Note that, while the image database 13*b* is separately provided in addition to the operation information database 13*a* in FIG. 1, both the operation information database 13*a* and the image database 13*b* may be integrally configured as the configuration of the database 13.

The information in the operation information column [D] further includes wearable terminal apparatus information [D1] obtained using the first image pickup apparatus (wearable terminal apparatus 20) and auxiliary camera information [D2] obtained using the second image pickup apparatus (auxiliary camera 30). The wearable terminal apparatus information [D1] is operation information mainly represented by a movie. The auxiliary camera information [D2] is operation information mainly represented by a still image.

The "tool confirmation" operation serving as the "first operation" included in the "first process: brushing" process is an operation for confirming a tool used in the operation process. Therefore, in the operation information [D], movie data (e.g., data referred to as movement data), for example, in which an action for holding the tool (brush) over a front surface (within an image pickup range) of the auxiliary camera 30 is recorded as the wearable terminal apparatus information [D1].

Examples of the auxiliary camera information [D2] include an enlarged image of the tool (brush) and an image of an ambient environment of the operator 100 (described as a "peripheral image" in FIG. 12). As the peripheral image, information about an operation room, an operation table, or the like, or clothes of the operator 100 is recorded as data such as text data or image data.

Figure 13:
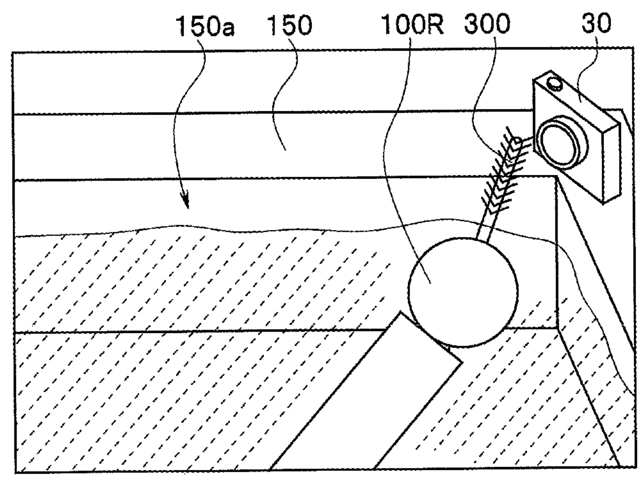
FIG. 13 is a diagram illustrating one scene of a movie acquired by the wearable terminal apparatus when the operator has held a predetermined tool (a brush), which the operator has in right hand, over a front surface (within an image pickup range) of the auxiliary camera to perform a "tool confirmation" operation.

When the operator performs the "tool confirmation" operation, operations, described below, are performed. That is, the operator 100 first performs an action for holding the predetermined tool (washing brush 300) used for an operation to be now performed over the front surface (within the image pickup range) of the auxiliary camera 30 with the predetermined tool in hand. The action is recorded as a movie by the wearable terminal apparatus 20. FIG. 13 is a diagram illustrating a situation at this time. That is, FIG. 13 illustrates one scene of the movie acquired by the wearable terminal apparatus 20 when the operator 100 has held the predetermined tool (the washing brush 300), which the operator 100 has in right hand 100R, over the front surface (within the image pickup range) of the auxiliary camera 30 to perform the "tool confirmation" operation. Note that a portion indicated by dotted hatched lines in FIG. 13 indicates how a washing liquid such as water is stored in the washing tank 150*a*. Brushing or the like of an instrument is mainly performed in the washing liquid such as water stored in the washing tank 150*a*.

The wearable terminal apparatus 20 picks up the action (the action for holding the washing brush 300 over the front surface of the auxiliary camera 30) performed by the operator 100. Simultaneously, the auxiliary camera 30 also picks up a live view image when an instrument (tool) in a defined form enters the image pickup range. Both the image pickup apparatuses (20, 30) each always continuously transfer acquired movie data (live view image data) to the control apparatus 10.

Figure 14:
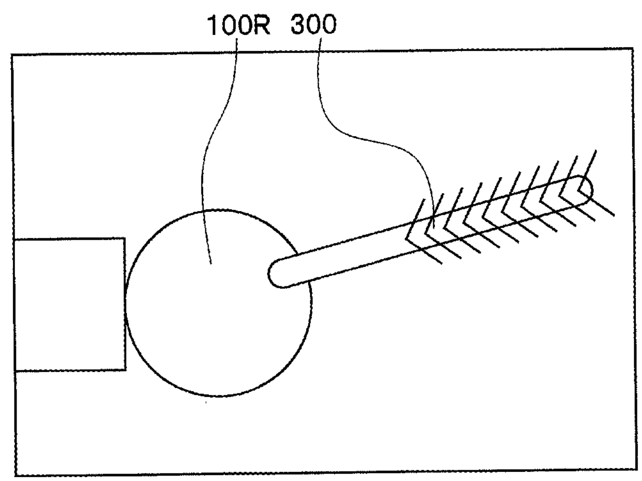
FIG. 14 illustrates a still image acquired by the auxiliary camera at a timing illustrated in FIG. 13.

The control apparatus 10 performs predetermined image judgment processing based on the received movie data. When the above-described defined action (the action for holding the brush over) is detected, for example, the control apparatus 10 controls the auxiliary camera 30, to perform an operation for picking up a still image. Thus, an enlarged image (still image) of the used tool (the washing brush 300) is recorded. The still image acquired at this time is as illustrated in FIG. 14, for example.

Further, subsequently thereto or simultaneously therewith, the auxiliary camera 30 records as a still image a state of an ambient environment (e.g., an operation room or an operation table) including the operator 100 (not illustrated).

Image data or the like thus acquired contributes to judgment whether the used tool (brush) is correct for use in the operation or whether the performed operational action is correct by referring to the image data or the like stored in the database 13. If it is judged that the performed action is correct as a result of the judgment, the acquired image data or the like is recorded as evidence information.

Figure 15:
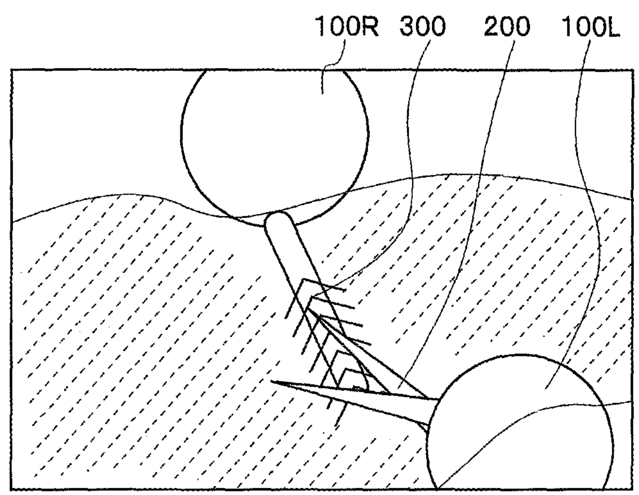
FIG. 15 illustrates one scene of movie data acquired by the wearable terminal apparatus when a first site (a blade portion) is being brushed.

The "first site brushing" operation serving as the "second operation" included in the "first process: brushing" process is an operation for brushing a first site of the target instrument "scissors". The first site is a "blade portion". Examples of operation information in this case include a number of times of brushing and a brushing time period detected based on an operation image, which are put into a database, as the wearable terminal apparatus information [D1], and a partially enlarged image of the first site of the tool (brush) as the auxiliary camera information [D2]. Note that FIG. 15 illustrates one scene of the movie data acquired by the wearable terminal apparatus 20 when the first site (blade portion) is being brushed. The operation is performed in water with which the washing tank 150*a* is filled. A portion indicated by dotted hatched lines in FIG. 15 indicates a washing liquid such as water stored in the washing tank 150*a*. That is, FIG. 15 illustrates how the instrument (scissors 200) is being brushed with the washing brush 300 in washing liquid such as water.

Similarly, the "second site brushing" operation serving as the "third operation" included in the "first process: brushing" process is an operation for brushing a second site of the target instrument "scissors". The second site is a "joint portion". Operation information in this case is substantially similar to the operation information in the above-described "second operation". That is, examples of the operation information include a number of times of brushing and a brushing time period, which are put into a database, as the wearable terminal apparatus information [D1], and a partially enlarged image of the second site of the tool (brush) as the auxiliary camera information [D2]. Note that FIG. 8 illustrates one scene of the movie data acquired by the wearable terminal apparatus 20 when the second site (joint portion) is being brushed.

Note that in the "second process: running water washing" process, a faucet of tap water, for example, is confirmed as a tool while an action for opening the faucet is confirmed and a flow rate or the like of tap water (running water) flowing from the faucet is confirmed. In the operation information, a defined operation time period for the target site is recorded.

In the "third process: scraping" process, examples of confirmation of a defined dedicated scraper such as paper or a cloth used for a scraping operation include confirmation of a brand of the scraper using an image of a package or the like of the scraper. In the operation information, a defined number of times of operation, operation time period, and the like for the target site are recorded.

In the "fourth process: agent sterilization" process, a brand or the like of an agent used for a sterilization operation, for example, a defined agent such as alcohol is confirmed using an image of a bottle or the like of the agent. In the operation information, a defined number of times of operation, operation time period, and the like for the target site are recorded.

Functions at the time when a predetermined maintenance operation (instrument washing and sterilization operation) is performed using the operation support system 1 according to the present embodiment will be described below with reference to flowcharts illustrated in FIGS. 9 to 11.

FIG. 9 is a flowchart illustrating functions of the control apparatus in the operation support system according to the present embodiment. FIG. 10 is a flowchart illustrating functions of the wearable terminal apparatus (the first image pickup apparatus) in the operation support system according to the present embodiment. FIG. 11 is a flowchart illustrating functions of the auxiliary camera (the second image pickup apparatus) in the operation support system according to the present embodiment.

First, in the operation support system 1 according to the present embodiment, power to each of the apparatuses (the control apparatus 10, the wearable terminal apparatus 20, and the auxiliary camera 30) is turned on. In this state, the operator 100 starts a predetermined operation under a predetermined environment illustrated in FIG. 7. As the predetermined operation herein described, a "scissors washing and sterilization operation" among maintenance operations for a medical instrument is illustrated as an example.

That is, the control apparatus 10 is in a state where the power is turned on and in a wait state for receiving of a predetermined instruction signal is waited for. The wearable terminal apparatus 20 is in a state where the power is turned on, is performing an operation for picking up a live view image, and is in a state where an instruction signal is waited for (step S201 illustrated in FIG. 10). Similarly, the auxiliary camera 30 is in a state where the power is turned on, is performing an operation for picking up a live view image, and is in a state where an instruction signal is waited for (step S301 illustrated in FIG. 11).

In this state, the operator 100 starts the predetermined "scissors washing and sterilization operation" in a predetermined operation place. First, the operator 100 performs an action for holding an instrument (the scissors 200) to be maintained over a front surface (within an image pickup range) of the auxiliary camera 30 with the instrument in hand in the "scissors washing and sterilization operation".

Consequently, the wearable terminal apparatus 20 detects whether the action (the action for holding the scissors 200 over the front surface of the auxiliary camera 30; hereinafter abbreviated as "the action for holding the scissors 200 over") has been performed (step S202 illustrated in FIG. 10). The detection processing is performed in the image judgment unit 21*b* in the control unit 21 in the wearable terminal apparatus 20, for example. If "the action for holding the instrument over" has been detected, the processing proceeds to step S203 illustrated in FIG. 10. If the action for holding the instrument over has not been detected, the wearable terminal apparatus 20 continues to repeat the detection processing.

In step S203 illustrated in FIG. 10, the control unit 21 in the wearable terminal apparatus 20 transmits information indicating that the action for holding the instrument over has been performed (hereinafter abbreviated as "information indicating that the instrument has been held over") to the control apparatus 10. Then, the control unit 21 enters a wait state while performing an operation for picking up a live view image in step S204.

The control apparatus 10, which is in the wait state confirms whether "the information indicating that the instrument has been held over" has been received in step S101 illustrated in FIG. 9. If the receiving of "the information indicating that the instrument has been held over" has been confirmed, the processing proceeds to subsequent step S102 illustrated in FIG. 9. Note that, if the receiving of the information has not been confirmed, the control apparatus 10 continues to wait for receiving of an instruction signal.

In step S102 illustrated in FIG. 9, the control unit 11 in the control apparatus 10 transmits to the auxiliary camera 30 a request/instruction (an image pickup request instruction) to perform a predetermined image pickup operation. Then, the control unit 11 waits for an image pickup result (e.g., image data of the scissors 200) to be transmitted from the auxiliary camera 30.

Figure 11:
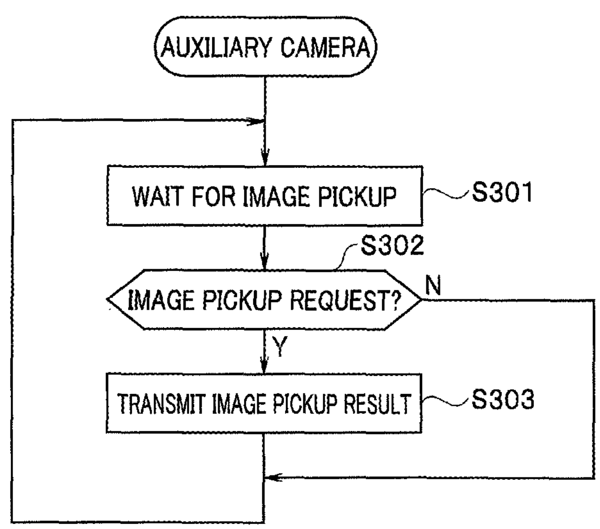
FIG. 11 is a flowchart illustrating functions of an auxiliary camera (a second image pickup apparatus) in the operation support system according to the embodiment of the present invention.

The auxiliary camera 30 confirms whether the image pickup request instruction from the control apparatus 10 has been received in step S302 illustrated in FIG. 11. If the receiving of the image pickup request instruction has been confirmed, the auxiliary camera 30 performs the predetermined image pickup operation. Then, the processing proceeds to step S303 illustrated in FIG. 11.

Image data acquired by the image pickup operation herein performed is image data of an ambient environment (e.g., an operation room or an operation table) including the operator 100, for example, in addition to enlarged image data of the scissors 200, for example. It can be confirmed whether the operation is being performed under a correct (defined) operation environment or whether the operator 100 is wearing a correct (defined) brace, specifically, a mask, gloves, or a face protector, for example, by acquiring the ambient environment data.

In step S303 illustrated in FIG. 11, the auxiliary camera 30 transmits information about image data (mainly still image data) acquired as a result of the image pickup operation toward the control apparatus 10. Then, the processing returns to step S301. In step S301, the auxiliary camera 30 waits for the receiving of the predetermined instruction signal while continuing to perform the operation for picking up a live view image.

The control apparatus 10 receives the image pickup result by the auxiliary camera 30 (the image data of the scissors 200) (step S102 illustrated in FIG. 9).

Note that, if the receiving of the image pickup request instruction has not been confirmed in step S302, the processing returns to step S301 illustrated in FIG. 11. In step S301 illustrated in FIG. 11, the auxiliary camera 30 waits for the receiving of the predetermined instruction signal while continuing to perform the operation for picking up a live view image.

Returning to FIG. 9 again, if the control apparatus 10 has received the image pickup result from the auxiliary camera 30 in step S102, the processing proceeds to subsequent step S103.

In step S103 illustrated in FIG. 9, the control apparatus 10 controls the object judgment unit 11*d*, the size judgment unit 11*e*, and the like in the control unit 11, to perform processing for judging a maintenance target instrument. The judgment processing is processing performed by referring to the image pickup result (the image data of the scissors 200) received in step S102, image data of the maintenance target instrument stored in the database 13, and the like.

Then, in step S104 illustrated in FIG. 9, the control apparatus 10 similarly controls the object judgment unit 11*d*, the size judgment unit 11*e*, and the like in the control unit 11 to perform processing for confirming a maintenance environment. This confirmation processing is processing performed by referring to the image pickup result (the image data of the ambient environment and the operator) received in step S102, corresponding data stored in the database 13, and the like. Then, the control apparatus 10 enters the state where the receiving of the predetermined instruction signal is waited for, and the processing proceeds to step S105.

In step S105 illustrated in FIG. 9, the control apparatus 10 then confirms whether "the information indicating that the tool has been held over" has been received. If the receiving of "the information indicating that the tool has been held over" has been confirmed, the processing proceeds to subsequent step S111 illustrated in FIG. 9. Note that, if the receiving of the information has not been confirmed, the control apparatus 10 continues to wait for the receiving of the instruction signal (loop processing in step S105).

The operator 100 starts the maintenance tool confirmation operation serving as the "first operation" in the "first process". As described above, an operation performed by the operator 100 in the "first operation: tool confirmation" operation is an action for the operator 100 holding an appropriate tool (the washing brush 300) used for the operation over the front surface (within the image pickup range) of the auxiliary camera 30 with the tool in hand.

Figure 10:
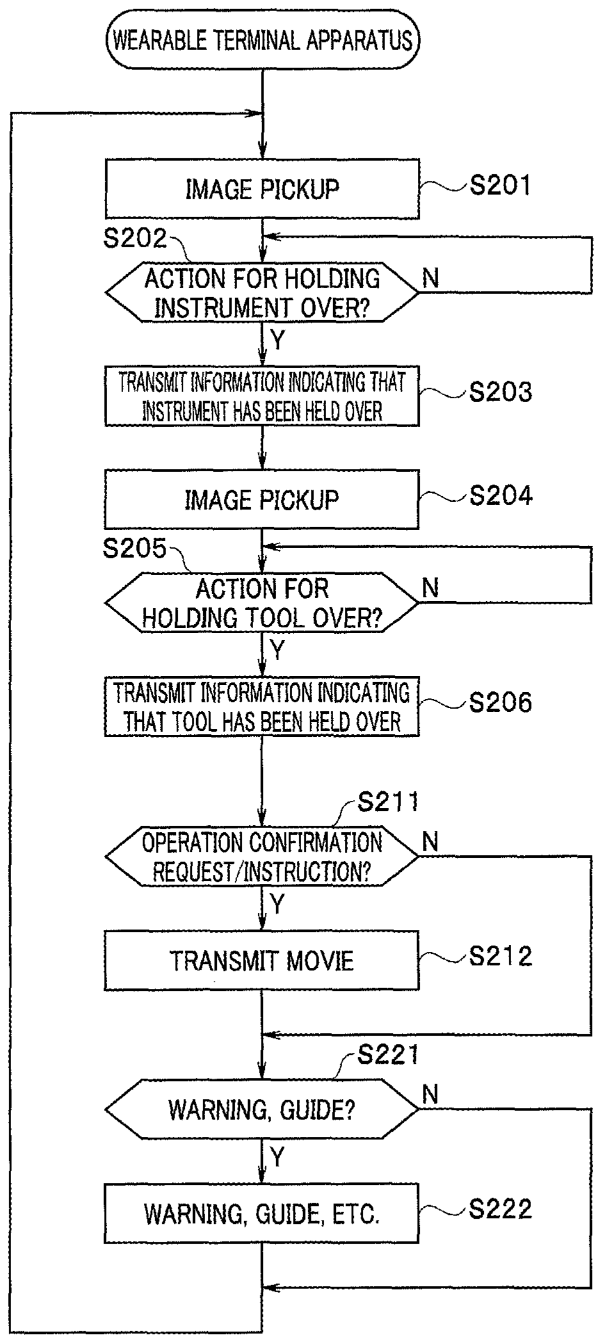
FIG. 10 is a flowchart illustrating functions of the wearable terminal apparatus (the first image pickup apparatus) in the operation support system according to the embodiment of the present invention.

Consequently, the wearable terminal apparatus 20, which has been in the wait state in the above-described processing in step S204, detects whether the action (the action for holding the washing brush 300 over the front surface of the auxiliary camera 30; abbreviated as "the action for holding the washing brush 300 over") has been performed in step S205 illustrated in FIG. 10. The detection processing is performed in the image judgment unit 21*b* in the control unit 21 in the wearable terminal apparatus 20, for example. If "the action for holding the tool over" has been detected, the processing proceeds to step S206 illustrated in FIG. 10. If "the action for holding the tool over" has not been detected, the wearable terminal apparatus 20 continues to repeat the detection processing.

In step S206 illustrated in FIG. 10, the control unit 21 in the wearable terminal apparatus 20 transmits information about "the action for holding the tool over" (abbreviated as "information indicating that the tool has been held over") to the control apparatus 10.

The control apparatus 10 in the wait state confirms whether "the information indicating that the tool has been held over" has been received in step S105 illustrated in FIG. 9. If the receiving of "the information indicating that the tool has been held over" has been confirmed, the processing proceeds to subsequent step S111 illustrated in FIG. 9. Note that, if the receiving of the information has not been confirmed, the control apparatus 10 continues to wait for the receiving of the instruction signal.

In step S111 illustrated in FIG. 9, the control unit 11 in the control apparatus 10 controls the operation judgment unit 11*a* or the like to perform processing for the maintenance tool confirmation operation ("the first operation").

Then, in step S112 illustrated in FIG. 9, the control apparatus 10 transmits an operation confirmation request/instruction to the wearable terminal apparatus 20. The operation confirmation request/instruction is an instruction signal for requesting the movie data acquired by the wearable terminal apparatus 20 after "the information indicating that the tool has been held over" has been transmitted.

In step S211 illustrated in FIG. 10, the wearable terminal apparatus 20 confirms whether the operation confirmation request/instruction has been received. If the operation confirmation request/instruction has been received, the processing proceeds to subsequent step S212.

Then, in the processing in step S212 illustrated in FIG. 10, the wearable terminal apparatus 20 transmits the acquired movie data to the control apparatus 10. Then, the processing proceeds to step S221.

In step S113 illustrated in FIG. 9, the control apparatus 10 receives the movie data transmitted from the wearable terminal apparatus 20 in the above-described processing in step S211. The control apparatus 10 compares the received movie data with the corresponding data stored in the database 13. The control apparatus 10 confirms whether the operation performed by the operator 100 is a correct (defined) operation based on the acquired movie data.

If there is no problem in a result of the above-described comparison, i.e., if it is confirmed that the operation performed by the operator 100 (operation recorded in the acquired movie) is a correct (defined) operation (if it is OK) in subsequent step S114, the processing proceeds to subsequent step S116. If it is not OK, the processing proceeds to step S115.

In step S115 illustrated in FIG. 9, the guide unit 11*c* in the control unit 11 in the control apparatus 10 transmits predetermined information about predetermined warning display, guide display, or the like to the wearable terminal apparatus 20. Then, the processing proceeds to step S116.

In step S221 illustrated in FIG. 10, the wearable terminal apparatus 20 confirms whether the information about warning display, guide display, or the like has been received. If the receiving of the information has been confirmed, the processing proceeds to subsequent step S222. If the receiving of the information has not been confirmed, the processing returns to step S201. In step S201, the wearable terminal apparatus 20 enters the wait state while performing the operation for picking up a live view image.

In step S222, the control unit 21 in the wearable terminal apparatus 20 controls the display unit 25, the voice output unit 28, and the like, to perform the warning display, guide display, and the like in a predetermined form.

Examples of the warning display, the guide display, and the like include voice information display using the voice output unit 28 in addition to visual information display using the display unit 25. Then, the processing returns to the above-described processing in step S201. In step S201, the wearable terminal apparatus 20 enters the wait state while performing the operation for picking up a live view image.

On the other hand, the control apparatus 10 confirms whether the process has ended in step S116. The confirmation is performed by referring to the database 13, for example. If it is confirmed that the process has ended, the processing proceeds to subsequent step S117. If it is not confirmed that the process has ended, i.e., if the process has not ended but a subsequent operation exists, the processing returns to step S113.

In step S117, the control apparatus 10 performs evidencing processing for the process which has ended. The evidencing processing is processing for recording the acquired image data or the like in a predetermined form, for example. Then, the processing proceeds to step S121.

In step S121, the control apparatus 10 then confirms whether all the processes in the operation have ended. If it is confirmed that all the processes have ended, the processing proceeds to subsequent step S122. If it is not confirmed that all the processes have ended, the processing proceeds to step S123.

If all the processes in the operation have not ended, the operator 100 shifts (changes) a maintenance tool in hand (a tool used in a previous operation) to a maintenance tool used in a subsequent operation (e.g., a second operation).

In this case, the control apparatus 10 confirms whether the maintenance tool has been changed in step S123 illustrated in FIG. 9. The processing then returns to step S105. In step S105 and subsequent steps, the control apparatus 10 repeats similar processing.

On the other hand, when the control apparatus 10 confirms that all the processes have ended in the above-described processing in step S121, and the processing proceeds to step S122, the control apparatus 10 performs final evidencing processing in step S122. Examples of the final evidencing processing include processing for filing the acquired plurality of image data or the like as a predetermined position file while creating a check list or the like based on an OK signal outputted in the above-described processing in step S114. Then, all the processes end, and the control apparatus 10 returns to the wait state.

As described above, according to the above-described embodiment, the operation support system 1 can provide operation support for reliably performing a predetermined series of operations including a plurality of operations according to a defined operation procedure and operation method by the two image pickup apparatuses (20, 30) and the control apparatus 10 acting on each other in cooperation with each other, thereby enabling operation errors to be suppressed.

The operation support system 1 can respectively record as image data and evidence a predetermined action and a used tool during an operation and a situation of an ambient environment or the like. Therefore, the operation support system 1 can ensure that a predetermined operation has been reliably performed as defined after the operation.

The operation support system 1 can provide support to perform a reliable operation by effectively utilizing image data acquired during an operation and eliminating operation errors based on the acquired plurality of image data and operation information stored in a database in advance while warning an operator and guiding a correct procedure when an operation error has occurred.

The operation errors (e.g., omission of a procedure, a sequential error in a procedure, and negligence in a defined operation) can be reliably eliminated. According, everyone can smoothly and reliably perform the defined operation while evidence recording of a passage of the operation can also be easily performed.

Note that, while all the first process to the fourth process are performed in the same place in the example of the operation (the instrument washing and sterilization operation) described in the above-described embodiment, the present invention is not limited to such a form. For example, all the plurality of operation processes may not be performed in the same place depending on the operation but the place may be changed when some of the operation processes are executed.

For example, in the operation example (the instrument washing and sterilization operation) described in the above-described embodiment, the first process and the second process may be performed on the operation table 150 including the washing tank 150*a*, and the third process and the fourth process may be performed using another operation table (not illustrated) in a different place.

The reason is that the first process and the second process are each a washing operation performed in a plumbing facility, while the third process and the fourth process are each desirably an operation performed in a dry place. In such a case, an auxiliary camera serving as another individual equivalent to the above-described auxiliary camera 30 may be disposed on the other operation table (not illustrated) on which the operations in the third process and the fourth process are performed, and the other auxiliary camera may be configured to act under the control of the above-described control apparatus 10 in cooperation with the control apparatus 10.

Although an example in which the auxiliary camera 30 is placed on the operation table 150 has been described in the above-described embodiment, the arrangement of the auxiliary camera 30 is not limited to the arrangement in the example.

Figure 16:
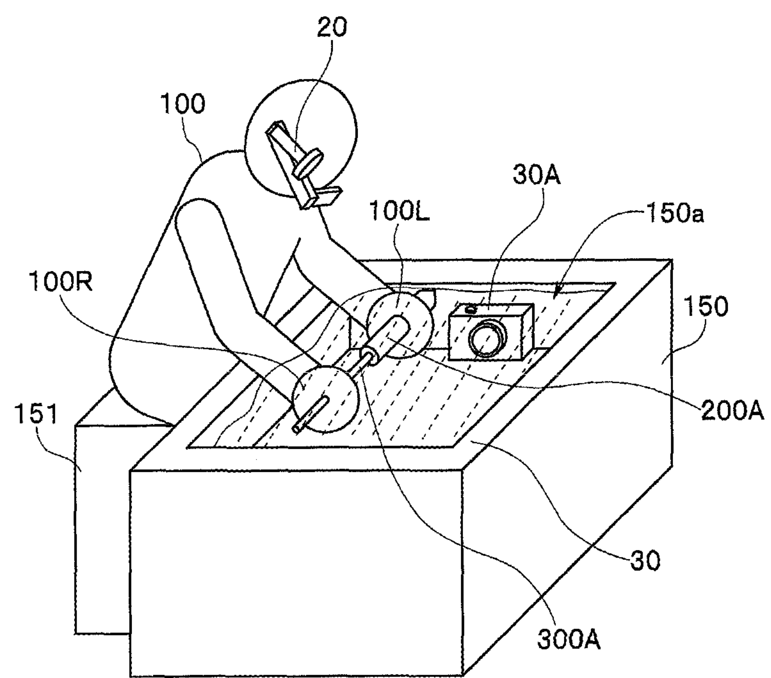
FIG. 16 is a conceptual diagram illustrating how a predetermined maintenance operation (an instrument washing and sterilization operation) is being performed using an operation support system according to a modification to the embodiment of the present invention.
Figure 17:
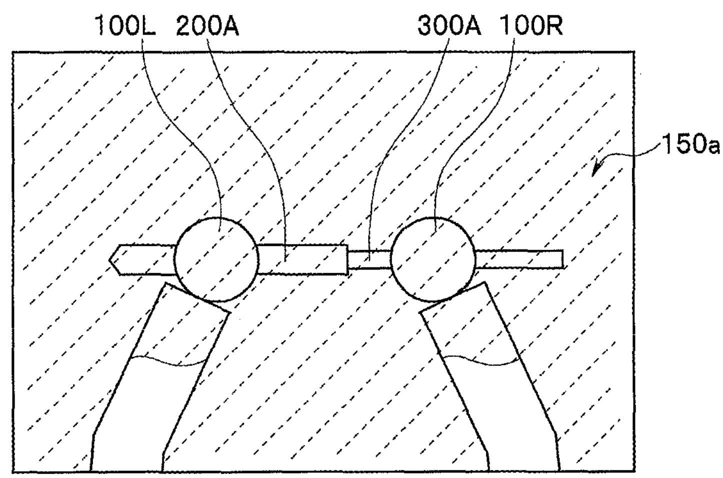
FIG. 17 is a diagram illustrating one scene of movie data acquired by a wearable terminal apparatus in the modification illustrated in FIG. 16.
Figure 18:
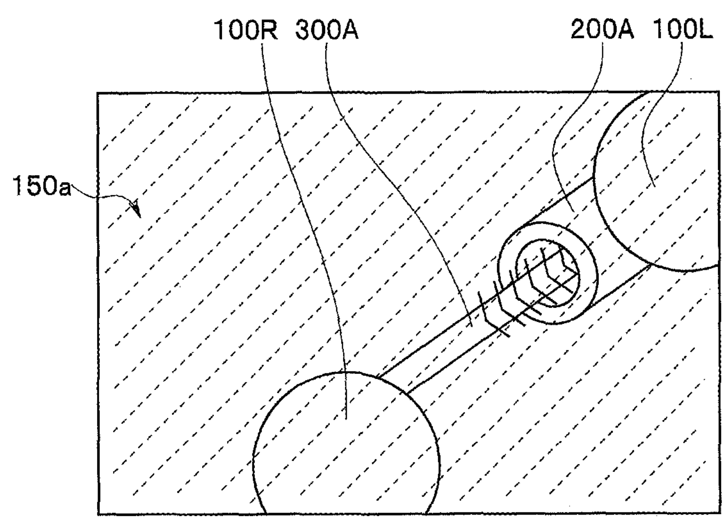
FIG. 18 is a diagram illustrating still image data acquired by an auxiliary camera in the modification illustrated in FIG. 16.

For example, the auxiliary camera 30 can also be disposed in a liquid in the washing tank 150*a*. FIG. 16 illustrates how the auxiliary camera 30 thus configured is. FIG. 16 is a conceptual diagram illustrating how a predetermined maintenance operation (instrument washing and sterilization operation) is being performed using an operation support system according to a modification to the above-described embodiment. FIG. 17 is a diagram illustrating one scene of movie data acquired by a wearable terminal apparatus in the modification illustrated in FIG. 16. FIG. 18 is a diagram illustrating still image data acquired by an auxiliary camera in the modification illustrated in FIG. 16.

In this modification, an auxiliary camera 30A disposed in a liquid is an image pickup apparatus having a waterproof function. If the auxiliary camera 30A is thus disposed in the liquid in the washing tank 150*a*, an operation in the liquid can be more clearly recorded.

Note that in the configuration, communication between the auxiliary camera 30A and the control apparatus 10 needs to be performed using a wired cable or exposing a wireless communication antenna to a water surface.

As a form of the wearable terminal apparatus 20, a wearable terminal apparatus can also have an image pickup function integrally incorporated into a face protector or the like to be always worn by an operator when an operation is performed, for example, in addition to the forms illustrated in the above-described embodiment and modification. In the wearable terminal apparatus thus configured, the operator needs to always wear the face protector before the operation. Thus, a burden of wearing a separate wearable terminal apparatus can be removed, and simultaneously an operator's error of forgetting to wear the wearable terminal apparatus can be suppressed.

If a control unit is put into the wearable terminal apparatus, the wearable terminal apparatus may be changed to a wearable apparatus including not only an image pickup unit configured to acquire eye image data to acquire operation information corresponding to the eye line of the operator but also a communication unit having a database storing operation information composed of image information from a plurality of visual fields relating to a predetermined operation in advance and configured to acquire an auxiliary image from an auxiliary camera apparatus provided at a different position from a position of the operator and an operation judgment unit configured to search for and judge the operation information in the database according to first image data and second image data, or may be changed to a system including a database outside the wearable apparatus and configured to search the database. The same applies to the auxiliary camera.

Note that a portion described as a "section or unit" in the embodiment may be configured by a dedicated circuit or a combination of a plurality of general-purpose circuits, or may be configured by being combined with a microcomputer configured to operate according to preprogrammed software, a processor such as a CPU, or a sequencer such as an FPGA (field programmable gate array), as needed. Such a design that an external apparatus assumes a part or the whole of control of the unit is permitted. In this case, a wired or wireless communication circuit is interposed between the section or unit and the external apparatus. Communication may be performed by Bluetooth, WiFi (Wireless Fidelity), a telephone line, or the like, or may also be performed by a USB (universal serial bus). The dedicated circuit, the general-purpose circuit, and a control unit may be integrally configured as an ASIC (application specific integrated circuit). A movement unit, for example, includes various types of actuators and includes a connection mechanism for movement, as needed, and the actuators operate by a driver circuit. The driver circuit is also controlled by a microcomputer, an ASIC, or the like according to a specific program. The control may be specifically corrected or adjusted, for example, according to information outputted by various types of sensors and peripheral circuits of the sensors.

Each of processing sequences described in the one above-described embodiment can permit a change of the processing sequence as long as the change is not contrary to the principle. Therefore, for the above-described processing sequence, an execution order of processing steps may be changed, the plurality of processing steps may be simultaneously executed, or the order of processing steps may differ for each execution of the series of processing sequences, for example. That is, even if operational flows are described using “first”, “next”, and the like for convenience in the claims, specification, and drawings, the description does not necessarily mean that operations are to be performed in this order. In each of the steps constituting the operational flows, it is needless to say that a portion, which does not affect the essence of the invention, can also be omitted, as needed.

In a technology herein described, most of control and functions mainly described in the flowcharts can be set by a software program, and the control and functions can be implemented by a computer reading and executing the software program.

Although description has been made by providing a control unit configured to control all devices in cooperation with one another for simplicity of illustration, each of the devices may be made to have a cooperation control function. A wearable apparatus may have such a control function, or a part of a control apparatus can also be considered as a wearable apparatus. An “auxiliary camera” may have a function of the control apparatus to control the wearable apparatus, or a system in which the control apparatus includes the auxiliary camera may be used. Further, some apparatuses may function as the control apparatus as a whole by transmitting a progress of each of steps to one another by communication.

The software program is electronic data the whole or a part of which is stored or recorded in advance in the above-described storage medium or storage unit, specifically, a storage medium such as a portable medium such as a nonvolatile memory such as a flexible disk CD-ROM (compact disc read only memory) or a volatile memory such as a hard disk in product manufacturing processes as a computer program product. The storage media may be arranged in a distributed manner for the devices to share control. Alternatively, the software program can be distributed or provided at the time of product shipping or via a portable medium or a communication line. A user can operate the software program via a communication network, the Internet, or the like by downloading the software program and installing the downloaded software programs into a computer or installing those software programs into the computer from the storage media, and thus can easily implement an image pickup apparatus according to the present embodiment.

The present invention is not limited to the above-described embodiment, and it is needless to say that various modifications and applications can be implemented without departing from the spirit of the invention. Further, the above-described embodiment includes inventions in various stages, and the various inventions can be extracted by an appropriate combination of a plurality of constitutional elements disclosed. Even if some of all the constitutional elements described in the above-described embodiment are deleted, for example, if the issue to be solved by the invention can be solved and the effect of the invention can be obtained, a configuration from which the constitutional elements are deleted can be extracted as the invention. Further, the components over different embodiments may be combined, as needed. The invention is not restricted by specific embodiments except as by the appended claims.

What is claimed is:

1. An operation support system comprising:

a first image pickup device configured to acquire movie data associated with an operation;

a second image pickup device configured to acquire still image data associated with the operation;

a control circuit in communication with the first image pickup device, the second image pickup device, and a database, the control circuit configured to control the first image pickup device and the second image pickup device in cooperation with each other while acquiring predetermined operation information from the movie data at a time when the operation is performed and ambient information on an operation target or operation tool from the still image data; and the database is configured to store operation information corresponding to a predetermined operation and to associate the predetermined operation information obtained from the movie data with the ambient information obtained from the still image data;

wherein the control circuit compares the predetermined operation information obtained from the movie data and an image of an operation target or operation tool obtained from the still image data respectively with the operation information in the database, and judges whether the operation is correctly performed.

2. The operation support system apparatus according to claim 1, wherein the first image pickup device is a wearable terminal apparatus configured to acquire movie data in an image pickup range substantially equivalent to a field of view of an operator and worn by the operator, the second image pickup device is an auxiliary camera configured to acquire still image data in a predetermined image pickup range including a predetermined object from a different direction from a direction of the wearable terminal apparatus, and the control circuit controls the auxiliary camera to acquire still image data according to the movie data acquired by the wearable terminal apparatus.

3. The operation support system according to claim 1, wherein the first image pickup device further includes a display, and the control circuit displays a warning using the display when the control circuit judges an operation error.

4. The operation support system according to claim 3, wherein the display is a display panel configured to display visual information.

5. The operation support system according to claim 3, wherein the display is a sound production device configured to sound voice information.

6. The operation support system according to claim 1, wherein the control circuit further includes an evidence recorder, and the evidence recorder records the movie data acquired during the operation by the first image pickup device and the still image data acquired during the operation by the still image data.

7. A wearable apparatus comprising:

a first image pickup device configured to acquire first image data during an operation with operation information corresponding to the direction of an eye line of an operator;

a communication unit configured to:

acquire second image data from a second image pickup device with ambient information relating to the operation, the second image pickup device provided at a different position from a position of the operator; and communicate with a database configured to store operation information corresponding to a predetermined operation and to associate the first image data with the second image data; and an operation judgment circuit configured to judge whether the operation is correctly performed by comparing the first image data and the second image data with the operation information stored in the database.

8. An image pickup apparatus comprising:

a receiver configured to:

receive first information from a wearable image pickup device configured to acquire first image data during an operation with operation information corresponding to a direction of an eye line of an operator during an operation;

receive second information from an auxiliary image pickup device configured to acquire second image data with ambient information relating to the operation, the auxiliary image pickup device provided at a different position from the direction of the eye line of the operator; and a database storing defined operation information about a predetermined operation in advance and to associate the first information with the second image information; and an operation judgment circuit configured to compare the first information and the second information with the defined operation information in the database to determine whether the predetermined operation was correctly performed.

9. An operation support method comprising:

acquiring first image data during an operation with operation information corresponding to the direction of an eye line of an operator;

acquiring second image data serving as operation information with ambient information relating to the operation acquired at a different position from the first image data;

communicating the acquired first image data and second image data to a control circuit in communication with a database, the database storing defined operation information including image information from a plurality of visual fields relating to a predetermined operation in advance; and judging whether the operation is correctly performed by comparing the first image data and the second image data with the defined operation information stored in the database.

10. An operation support system comprising:

a wearable terminal device configured to acquire movie data associated with an operation in an image pickup range substantially equivalent to a field of view of an operator and worn by the operator;

an auxiliary camera configured to acquire still image data associated with the operation in a predetermined image pickup range including a predetermined object from a different direction from a direction of the wearable terminal device;

a control circuit in communication with the wearable terminal device, the auxiliary camera, and a database, the control circuit configured to control the wearable terminal device and the auxiliary camera in cooperation with each other while acquiring predetermined operation information at a time when the operation is performed from the movie data and information on an ambient environment from the still image data; and the database is configured to store operation information corresponding to a predetermined operation and to associate the predetermined operation information obtained from the movie data with the information on the ambient environment obtained from the still image data, wherein the auxiliary camera is controlled, based on the movie data acquired by the wearable terminal device, to acquire still image data serving as evidence of an operation, and the control circuit compares the predetermined operation information obtained from the movie data and the information on the ambient environment obtained from the still image data with the operation information stored in the database, and judges whether the operation is correctly performed.

11. An operation support method comprising:

acquiring movie data associated with an operation in an image pickup range substantially equivalent to a field of view of an operator;

acquiring still image data associated with the operation in a predetermined image pickup range including a predetermined object according to the acquired movie data from a different direction from a direction of the movie data as evidence of an operation;

communicating the acquired movie data and the acquired image data to a control circuit in communication with a database storing defined operation information;

associating the movie data with the still image data; and judging whether the predetermined operation was correctly performed by comparing the movie data and the image data with the defined operation information stored in the database.

* * * * *